United States Patent [19]

Takei

[11] Patent Number: 5,420,630
[45] Date of Patent: May 30, 1995

[54] IMAGE PICKUP APPARATUS PERFORMING WHITE BALANCE CONTROL BASED ON DATA FROM REGIONS OF A FRAME

[75] Inventor: Hirofumi Takei, Yokohama, Japan

[73] Assignee: Canon Kabushiki Kaisha, Tokyo, Japan

[21] Appl. No.: 117,772

[22] Filed: Sep. 8, 1993

[30] Foreign Application Priority Data

Sep. 11, 1992 [JP] Japan .................................. 4-243478
Sep. 11, 1992 [JP] Japan .................................. 4-243479
Sep. 11, 1992 [JP] Japan .................................. 4-243480

[51] Int. Cl.$^6$ .............................................. H04N 9/73
[52] U.S. Cl. .................................... 348/223; 348/224
[58] Field of Search ............... 348/223, 224, 225, 296; H04N 9/73

[56] References Cited

U.S. PATENT DOCUMENTS 5,223,921  6/1993  Haruki et al. ........................ 348/223
5,262,848  11/1993  Kim ..................................... 348/223

FOREIGN PATENT DOCUMENTS 0218993  11/1985  Japan .............................. H04N 9/73
0107592  5/1987  Japan .............................. H04N 9/73

Primary Examiner—Victor R. Kostak
Attorney, Agent, or Firm—Fitzpatrick, Cella, Harper & Scinto

[57] ABSTRACT

Image pickup apparatus performing white balance control based on data from regions of the frame includes image pickup structure. Detection structure is provided for detecting color data from a color video signal corresponding to each of a plurality of regions of a photographic frame of the image pickup structure. White balance control circuitry is provided for controlling a white balance of the color video signal based on an output of the detection structure. Selection circuitry is provided for selecting one of a first mode in which color data of a first number of regions is used, and a second mode in which color data of a second, different, number of regions is used.

25 Claims, 30 Drawing Sheets

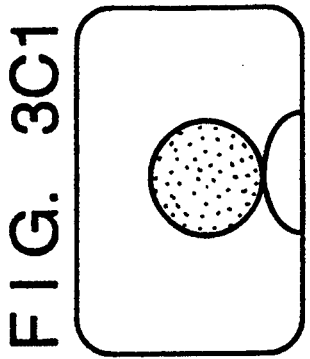
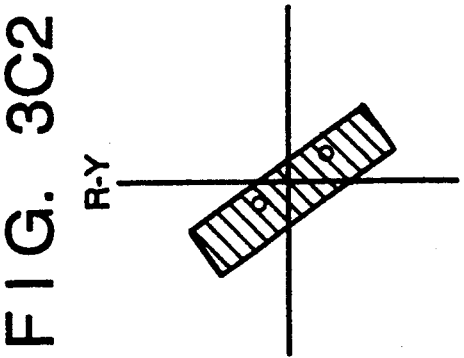
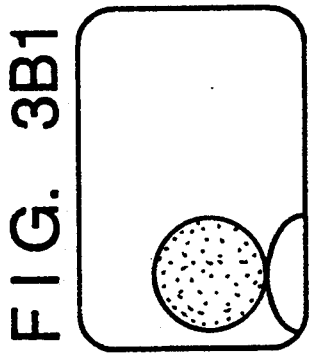
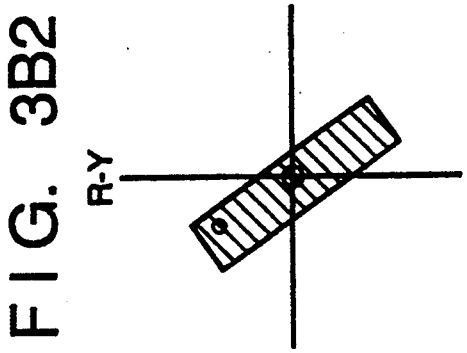
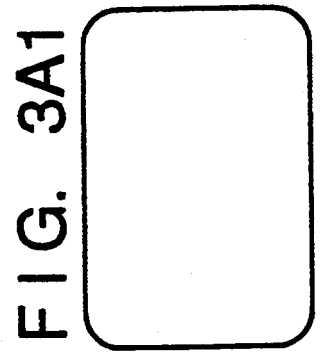
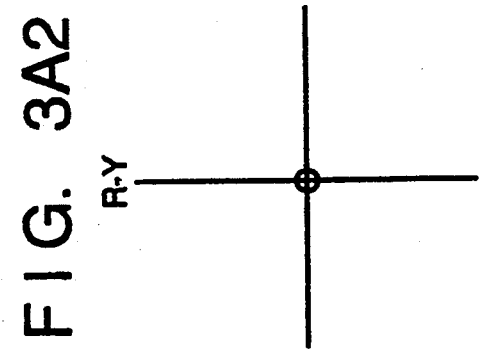

FIG. 6
(PRIOR ART)

|  | REGIONS FROM WHICH DATA ARE LOADED |
|---|---|
| 1ST FIELD | W11, W13, W15, W17 |
| 2ND FIELD | W12, W14, W16, W18 |
| 3RD FIELD | W21, W23, W25, W27 |
| 4TH FIELD | W22, W24, W26, W28 |
| 5TH FIELD | W31, W33, W35, W37 |
| 6TH FIELD | W32, W34, W36, W38 |
| 7TH FIELD | W41, W43, W45, W47 |
| 8TH FIELD | W42, W44, W46, W48 |
| 9TH FIELD | W51, W53, W55, W57 |
| 10TH FIELD | W52, W54, W56, W58 |
| 11TH FIELD | W61, W63, W65, W67 |
| 12TH FIELD | W62, W64, W66, W68 |
| 13TH FIELD | W71, W73, W75, W77 |
| 14TH FIELD | W72, W74, W76, W78 |
| 15TH FIELD | W81, W83, W85, W87 |
| 16TH FIELD | W82, W84, W86, W88 |

FIG. 8

| R1 B1 YH1 | R9 B9 YH9 | R17B17 YH17 | R25B25 YH25 | R33B33 YH33 | R41B41 YH41 | R49B49 YH49 | R57B57 YH57 |
|---|---|---|---|---|---|---|---|
| R2 B2 YH2 | R10B10 YH10 | R18B18 YH18 | R26B26 YH26 | R34B34 YH34 | R42B42 YH42 | R50B50 YH50 | R58B58 YH58 |
| R3 B3 YH3 | R11B11 YH11 | R19B19 YH19 | R27B27 YH27 | R35B35 YH35 | R43B43 YH43 | R51B51 YH51 | R59B59 YH59 |
| R4 B4 YH4 | R12B12 YH12 | R20B20 YH20 | R28B28 YH28 | R36B36 YH36 | R44B44 YH44 | R52B52 YH52 | R60B60 YH60 |
| R5 B5 YH5 | R13B13 YH13 | R21B21 YH21 | R29B29 YH29 | R37B37 YH37 | R45B45 YH45 | R53B53 YH53 | R61B61 YH61 |
| R6 B6 YH6 | R14B14 YH14 | R22B22 YH22 | R30B30 YH30 | R38B38 YH38 | R46B46 YH46 | R54B54 YH54 | R62B62 YH62 |
| R7 B7 YH7 | R15B15 YH15 | R23B23 YH23 | R31B31 YH31 | R39B39 YH39 | R47B47 YH47 | R55B55 YH55 | R63B63 YH63 |
| R8 B8 YH8 | R16B16 YH16 | R24B24 YH24 | R32B32 YH32 | R40B40 YH40 | R48B48 YH48 | R56B56 YH56 | R64B64 YH64 |

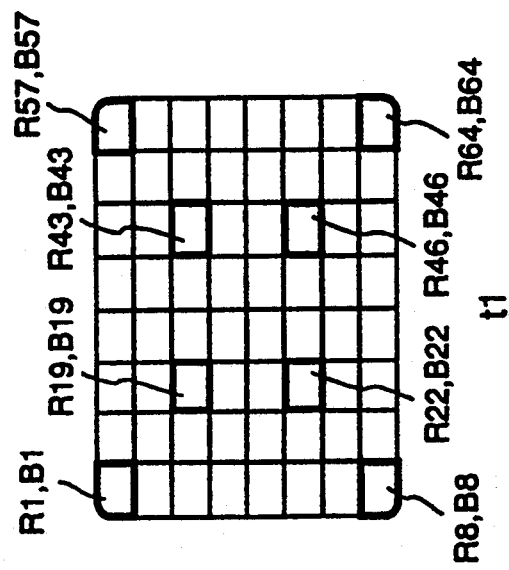
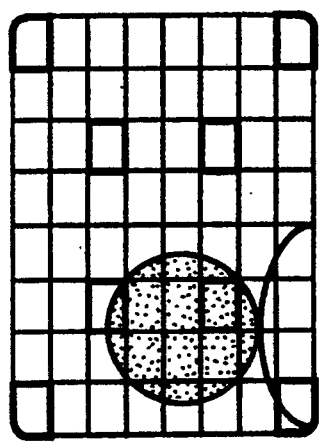
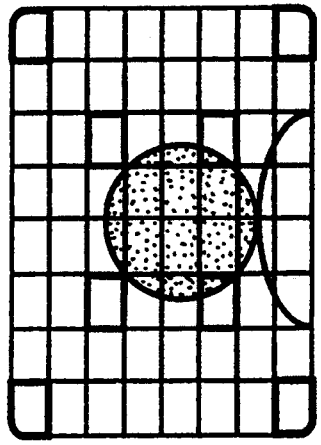
FIG. 16C
FIG. 16B
FIG. 16A

FIG. 23

| SHIFT CONDITION | SHIFT DIRECTION | TIMER TRIGGER |
|---|---|---|
| a: LUMINANCE SIGNAL ≒ 0 | <2> <3> <11> | NO |
| b: INCREASE IN LUMINANCE LEVEL FROM LUMINANCE SIGNAL ≒ 0 | <1> | YES |
| c: LARGE CHANGE IN LUMINANCE | <10> | NO |
| d: R (Ymax) = Rref AND B (Ymax) = Bref | <8> <9> <12> | NO |
| e: Ravr = Rref AND Bavr = Bref | <2> <3> | NO |
| f: Ravr (w) = Rref AND Bavr (w) = Bref | <2> <3> | NO |
| g: CHANGE IN COLOR TEMPERATURE | <10> | NO |
| h: NO DATA OBTAINED BY WHITE EXTRACTION | <3> | NO |
| i: Ravr AND Bavr OUTSIDE WHITE EXTRACTION AREA | <3> | NO |
| j: HIGH-SPEED OPERATION TIMER OVERFLOW | <5> | NO |
| k: CONDITIONS c AND g | <6> <7> <1> | YES |
| ℓ: NONE OF CONDITIONS e, f, h, AND i | <4> | NO |

FIG. 30

| W11 | W21 | W31 | W41 | W51 | W61 | W71 | W81 |
|-----|-----|-----|-----|-----|-----|-----|-----|
| W12 | W22 | W32 | W42 | W52 | W62 | W72 | W82 |
| W13 | W23 | W33 | W43 | W53 | W63 | W73 | W83 |
| W14 | W24 | W34 | W44 | W54 | W64 | W74 | W84 |
| W15 | W25 | W35 | W45 | W55 | W65 | W75 | W85 |
| W16 | W26 | W36 | W46 | W56 | W66 | W76 | W86 |
| W17 | W27 | W37 | W47 | W57 | W67 | W77 | W87 |
| W18 | W28 | W38 | W48 | W58 | W68 | W78 | W88 |

FIG. 31

|  | REGIONS FROM WHICH DATA ARE LOADED |
|---|---|
| 1ST FIELD | W11, W13, W15, W17 |
| 2ND FIELD | W22, W24, W26, W28 |
| 3RD FIELD | W31, W33, W35, W37 |
| 4TH FIELD | W42, W44, W46, W48 |
| 5TH FIELD | W51, W53, W55, W57 |
| 6TH FIELD | W62, W64, W66, W68 |
| 7TH FIELD | W71, W73, W75, W77 |
| 8TH FIELD | W82, W84, W86, W88 |

FIG. 32

| W11 | W21 | W31 | W41 | W51 | W61 | W71 | W81 |
|-----|-----|-----|-----|-----|-----|-----|-----|
| W12 | W22 | W32 | W42 | W52 | W62 | W72 | W82 |
| W13 | W23 | W33 | W43 | W53 | W63 | W73 | W83 |
| W14 | W24 | W34 | W44 | W54 | W64 | W74 | W84 |
| W15 | W25 | W35 | W45 | W55 | W65 | W75 | W85 |
| W16 | W26 | W36 | W46 | W56 | W66 | W76 | W86 |
| W17 | W27 | W37 | W47 | W57 | W67 | W77 | W87 |
| W18 | W28 | W38 | W48 | W58 | W68 | W78 | W88 |

FIG. 33

|  | REGIONS FROM WHICH DATA ARE LOADED |
|---|---|
| 1ST FIELD | W11, W33, W55, W77 |
| 2ND FIELD | W81, W63, W45, W27 |
| 3RD FIELD | W22, W44, W66, W88 |
| 4TH FIELD | W72, W54, W36, W18 |

IMAGE PICKUP APPARATUS PERFORMING WHITE BALANCE CONTROL BASED ON DATA FROM REGIONS OF A FRAME

BACKGROUND OF THE INVENTION

The present invention relates to an image pickup apparatus and, more particularly, to an image pickup apparatus having a white balance correcting function of correcting the white balance of a video signal obtained from the output terminal of the image pickup means.

In a conventional image pickup apparatus designed to perform white balance correction by using signals from an image sensor, the influence of a chromatic object (to be photographed) is eliminated by a known method of performing white balance correction by using only signals from a white object or an object having a color close to white or signals having possibilities of representing such an object.

In this method, for example, only the above-mentioned signals are extracted from a Y (luminance) signal and R (red)−Y and B (blue)−Y signals as two types of color difference signals obtained from a signal processing circuit in a camera, and white balance correction is performed by setting the extracted color difference signal components to be close to 0. Such a method will be referred to as a white extraction scheme hereinafter. This scheme will be briefly described below.

FIG. 1 is a graph for explaining a signal extraction range in a white extraction scheme of this type. Referring to FIG. 1, coordinates represent vectors of video signals such as television signals.

Consider an image pickup apparatus which performs white balance correction in the range of color temperatures of 3,000° K. to 10,000° K. Assume that correction is performed to bring a white object photographed at a color temperature of 10,000° K. into a state of a good white balance. In this case, a signal corresponding to the object corresponds to a point P0 in FIG. 1. If a white object at 3,000° K. is present, a signal corresponding to the object is a point P1 in FIG. 1.

In contrast to this, assume that correction is performed to bring a white object photographed at a color temperature of 3,000° K. into a state of a good white balance. In this case, a signal corresponding to the object corresponds to the point P0 in FIG. 1. If a white object at a color temperature of 10,000° K. is present, a signal corresponding to the object is a point P2.

That is, color reproduction changes along a thick line A in FIG. 1 with a change in color temperature of a white object.

Considering two-dimensional coordinates represented by x [=(R−Y)−(B−Y)=R−B] and y [= (R−Y)+(B−Y)=R+B−2Y] in FIG. 1, the above-mentioned change indicates that the influence of a change in color temperature on color reproduction is small in the y direction and changes in only the e direction in accordance with a change in color temperature.

Assume that white balance correction is performed within the range of 3,000° K. to 10,000° K. in this manner. In this case, when only signals are extracted from the range (white extraction range) indicated by the hatching in FIG. 1, all the signals from a white object or an object having a color close to white are extracted. If white balance correction is performed by using these signals, the influence of a chromatic object can be reduced, and sufficient data for white balance control can be obtained.

FIG. 2 is a block diagram showing the arrangement of a main part of a conventional image pickup apparatus designed to perform white balance control based on such a white extraction scheme.

Referring to FIG. 2, reference numeral 1 denotes an image sensor for photoelectrically converting object light incident through a lens 21 and an iris 22; and 2, a luminance/chrominance signal generator for generating a high-frequency component ($Y_H$) of a luminance signal, a low-frequency component ($Y_L$) of the luminance signal, a red (R) signal, and a blue (B) signal by using a signal from the image sensor 1. The R and B signals generated by the luminance/chrominance signal generator 2 are respectively supplied to gain control circuits 3 and 4. The amplification factors of the gain control circuits 3 and 4 are respectively controlled by control signals from a tracking correction circuit 17 (to be described later). The gain control circuits 3 and 4 respectively amplify the R and B signals in accordance with the controlled amplification factors.

Assume that signals output from the gain control circuits 3 and 4 are R' and B' signals, respectively. In this case, the R' and B' signals are input to a color difference signal generator 5 together with the $Y_L$ signal. Color difference signals (R−Y) and (B−Y) are then generated by the color difference signal generator 5.

These color difference signals (R−Y) and (B−Y) are input to an encoder 6 together with the $Y_H$ signal to be converted into a standard television signal. Reference numeral 28 denotes an output terminal for outputting this standard television signal.

Meanwhile, the color difference signals (R−Y) and (B−Y) are also input to an automatic white balance correction unit 20 and are respectively supplied to clamping circuits 7 and 8. In the clamping circuits 7 and 8, the DC potentials of the color difference signals (R−Y) and (B−Y) are matched with each other. The outputs from the clamping circuits 7 and 8 are input to both a subtracter 9 and an adder 10.

The subtracter 9 calculates the difference between the (R−Y) signal and the (B−Y) signal to generate a signal component in the coordinate E direction in FIG. 1. The adder 10 calculates the sum of the (R−Y) signal and the (B−Y) signal to generate a signal component in the coordinate y direction in FIG. 1.

Comparators 11 and 12 compare the y signal output from the adder 10 with reference levels THa and THb corresponding to the line segments represented by y=a and y=b in FIG. 1, respectively, and output the binary comparison outputs to an OR circuit 13. The output from the OR circuit 13 becomes a binary signal which is set at low level (Lo) only when the level of the y signal falls within the range of a≧y≧b, and is set at high level (Hi) in other cases. The binary signal is then supplied, as a gate control signal, to a gate circuit 14.

Meanwhile, the E signal, i.e., the (R−B) signal, output from the subtracter 9 is gated by the gate circuit 14 to be supplied to a clip circuit 15 only when the output from the OR circuit 13 is set at Lo. In the clip circuit 15, signal components, of the E signal, which correspond to the portions indicated by x>c and x<d in FIG. 1 are clipped or rendered nonconductive. As a result, only the signal components within the white extraction range indicated by the hatching in FIG. 1 are output to a control signal generator 16.

The control signal generator 16 outputs correction signals for controlling the average values of input signal components to be equal to reference potentials Rref and Bref corresponding to the average values of signals having good white balances. The outputs from the control signal generator 16 are supplied to a tracking correction circuit 17. In the tracking correction circuit 17, the outputs are corrected to allow white balance control along the trace of a change in color temperature. The resultant white balance-corrected signals are output, as signals Rcont and Bcont, to the gain control circuits 3 and 4, respectively.

With this arrangement, the influence of a chromatic object can be reduced to a certain degree, and white balance correction which allows acquisition of sufficient control data can be performed as compared with the case wherein only a portion having the maximum luminance is extracted as a white object.

However, in the conventional image pickup apparatus described with reference to FIGS. 1 and 2, it is difficult to obtain both good tracking characteristics with respect to an illumination condition for an object and high stability with respect to a case wherein a chromatic color enters the frame.

If, for example, a control speed is set to be high with preference being given to tracking characteristics with respect to a change in illumination condition, the white balance changes too sensitively with respect to a slight movement of an object or a change therein, thus causing discomfort to the human eye. In contrast to this, if the control speed is set to be low in consideration of stability, the tracking characteristics deteriorate with respect to a large change in photographic condition, e.g., a change from an indoor condition to an outdoor condition. As a result, a frame lacking in white balance may be photographed for a long period of time.

In the conventional image pickup apparatus described with reference to FIGS. 1 and 2, since a white balance correction value is calculated from only regions considered as achromatic regions, the following erroneous operation may be performed.

Assume that the face of a human figure enters a photographic frame with a white background, as shown in FIGS. 3A1, 3B1, and 3C1. In this case, if the state shown in FIG. 3A1 is the initial state, and only a white object is present in this state, the white balance is accurately corrected, as shown in FIG. 3A2. As a result, a signal corresponding to the coordinate point indicated by the circle in FIG. 3A2 is output.

When the face of a human figure enters the frame in this state, as shown in FIG. 3B1, even a signal corresponding to the skin color of the human figure falls within the above-described white extraction range, as shown in FIG. 3B2. As a result, the control signal generator 16 outputs correction signals Rcont and Bcont in such a manner that the average values of signal components within the white extraction range, including the signal corresponding to the skin color, are set to be equal to reference potentials Rfef and Bref. With this operation, the coordinate positions indicated by the circles in FIG. 3C2 become the positions of the signals corresponding to the skin color and the white object after white balance correction. As a result, the white background is tinged with blue, and the skin color of the human figure fades.

Such a problem is not limited to a case of a white background, and a more serious problem is posed when the background has a chromatic color such as green or red. More specifically, in this case, since the white balance is corrected by using only a color signal corresponding to the color skin, the skin color fades to a greater degree. As a result, proper color reproduction cannot be performed with respect to a frame having such a special composition.

As described above, even in white balance control based on the conventional white extraction scheme, it is difficult to obtain both good tracking characteristics and high stability and completely eliminate the influences of various chromatic objects.

FIG. 4 is a block diagram showing the arrangement of a main part of another conventional image pickup apparatus designed to perform white balance control based on such a white extraction scheme.

Referring to FIG. 4, reference numeral 51 denotes an image sensor for photoelectrically converting object light incident through a lens 71 and an iris 72; and 52, a luminance/chrominance signal generator for generating a high-frequency component ($Y_H$) of a luminance signal, a low-frequency component ($Y_L$) of the luminance signal, a red (R) signal, and a blue (B) signal by using a signal from the image sensor 51. The R and B signals generated by the luminance/chrominance signal generator 52 are respectively supplied to gain control circuits 53 and 54. The amplification factors of the gain control circuits 53 and 54 are respectively controlled by control signals from digital-analog (D/A) converters 93 and 94 (to be described later). The gain control circuits 53 and 54 respectively amplify the R and B signals in accordance with the controlled amplification factors.

Assume that signals output from the gain control circuits 53 and 54 are R' and B' signals, respectively. In this case, the R' and B' signals are input to a color difference signal generator 55 together with the $Y_L$ signal. Color difference signals (R−Y) and (B−Y) are then generated by the color difference signal generator 55.

These color difference signals (R−Y) and (B−Y) are input to an encoder 56 together with the $Y_H$ signal to be converted into a standard television signal. Reference numeral 78 denotes an output terminal for outputting this standard television signal.

Meanwhile, the color difference signals (R−Y) and (B−Y) are respectively input to analog-digital (A/D) converters 80 and 81, and the $Y_H$ signal is input to an A/D converter 82. Outputs from these A/D converters 80, 81, and 82 are respectively input to switch circuits 83, 84, and 85. The switch circuits 83, 84, and 85 are controlled in accordance with a sync signal S1 from a sync signal generator 95 and a region designation signal S2 from a correction signal calculation section 92, and supply A/D-converted outputs corresponding to designated regions, of 64 regions into which one frame is divided, as shown in FIG. 5, to adders 86, 87, and 88, which are connected to the output terminals of the switch circuits 83, 84, and 85, respectively.

Even in a case wherein only color signals from a white object or an object having a color close to white are to be used, or in a case wherein color data formed from a color signal component from each region is to be weighted, the integral value of a color signal must be obtained for each of the 64 regions shown in FIG. 5. Therefore, the correction signal calculation section 92 must sequentially designate all the regions, ranging from a region W11 to a region W88 in FIG. 5.

Operations of the adders 86, 87, and 88 and hold circuits 89, 90, and 91 will be described next. The hold circuits 89, 90, and 91 are respectively connected to the output terminals of the adders 86, 87, and 88 so that outputs from the adders 86, 87, and 88 are temporarily held in the hold circuits 89, 90, and 91. The data held in the hold circuits 89, 90, and 91 are respectively input to the adders 86, 87, and 88 again to be added to the next A/D conversion values. That is, a digital integrator is constituted by a set of a hold circuit and an adder.

When the hold circuits 89, 90, and 91 complete integration (accumulation) of A/D conversion values corresponding to one region, the correction signal calculation section 92 loads the held data, i.e., the integral value. The hold circuits 89, 90, and 91 are reset by a reset signal S3 output from the correction signal calculation section 92 immediately after this operation.

When the integral value of the (B−Y), (R−Y), and $Y_H$ signals associated with the region W11 in FIG. 5 is to be obtained, this integrating operation is completed at time t1 in FIG. 5. That is, this integration requires a period of time almost ⅛ the vertical sync period. The correction signal calculation section 92 loads the integral values held in the hold circuits 89, 90, and 91 at time t1, and outputs the reset signal S3 to the hold circuits 89, 90, and 91.

In this case, since a short time ts is required to designate this reset operation and the next region, the region which can be designated next is the region W13 or the subsequent region. For this reason, the maximum number of regions from which integral values can be loaded by the correction signal calculation section 92 in one vertical sync period is four. That is, as shown in FIG. 6, if the integral value of the respective signals in the regions W11, W13, W15, and W17 are loaded in the first field, the integral values of the respective signals in the regions W12, W14, W16, and W18 are loaded in the second field. In the third field, the integral values of the respective signals in the regions W21, W23, W25, and W27 are loaded. In this manner, the integral values of the respective signals in the 64 regions of the entire frame are sequentially loaded.

In the image pickup apparatus in FIG. 4, therefore, a period of time corresponding to 16 fields is required to load the integral values of the respective signals in all the regions.

In the correction signal calculation section 92, after the integral values of the respective regions are loaded in this manner, these data are weighted depending on whether the data correspond to a white object, thus obtaining the average values of the data associated with the entire frame. That is, an average value Ravr of the integral values of the (R−Y) signals corresponding to the 64 regions is calculated, and an average value Bavr of the integral values of the (R−Y) signals corresponding to the 64 regions is calculated, and signals (white balance correction values) Rcont and Bcont for controlling the gain control circuits 53 and 54 are calculated such that the average values Ravr and Bavr become equal to reference values Rref and Bref for white balance correction. In this case, the reference values Rref and Bref are equivalent to the average value of the (R−Y) signals with a proper white balance and the average value of the (B−Y) signals with a proper white balance, respectively.

The white balance correction values Rcont and Bcont serve to control the gain control circuits 53 and 54 through the D/A converters 93 and 94, thus performing white balance correction.

In the above-described image pickup apparatus, white balance correction values cannot be calculated unless all the integral values of the respective signals from the plurality of regions into which the frame is divided are loaded.

The white balance correction speed, therefore, is limited by the time required to load the integral values of all the divided regions of the entire frame. For example, if the frame is divided into 64 regions, a 16-field period is required to load the integral values of the divided regions of the entire frame, as described above. When the field frequency is 1/60 seconds, a white balance correction value is updated 3.74 times at maximum within one second. As the number of divided regions of the frame is increased, the time required for this update processing is further prolonged.

For this reason, when the white balance must be caused to follow an abrupt change in color temperature or the like, since the correction speed is limited, the white balance may not be caused to follow the change in color temperature within a short period of time.

SUMMARY OF THE INVENTION

The present invention has been made in consideration of the above-described problems, and has as its principal object to provide an image pickup apparatus designed to correct the white balance of a color video signal obtained from an image pickup means, in which both excellent tracking characteristics and high stability can be obtained.

It is another object of the present invention to provide an image pickup apparatus in which the influence of a chromatic object on frames having various patterns can be sufficiently eliminated.

It is further object of the present invention to provide an image pickup apparatus in which almost no erroneous correction which causes visual disturbance is performed, and stable, high-speed white balance correction can be performed.

It is further object of the present invention to provide an image pickup apparatus designed to correct the white balance of a color video signal obtained from an image pickup means, in which the white balance can be caused to follow a change in color temperature within a short period of time, and high-precision white balance correction can be performed in a normal operation.

In order to solve the above-described problems and achieve the above objects, according to the first aspect of the present invention, an image pickup apparatus is characterized by the following arrangement.

An image pickup apparatus comprises image pickup means, white balance correction means for correcting white balance of a color video signal output from an output terminal of the image pickup means, detection means for detecting a change in color signal in each of a plurality of regions of a photographic frame of the image pickup means, determination means for determining the presence/absence of a change in color temperature on the basis of a detection result obtained by the detecting means with respect to each of the plurality of regions, and control means for stopping an operation of the white balance correction means in accordance with an output from the determination means.

With this arrangement, white balance correction can be performed only when a change in color temperature occurs. Even if, therefore, a chromatic object enters the photographic frame, white balance correction is not performed unless a change in color temperature occurs. This prevents a deterioration in natural color reproduction for an object, which deterioration is caused by erroneous white balance correction. Consequently, stable, proper white balance correction can be performed with only a small correction error in terms of a visual effect.

In addition, according to the second aspect of the present invention, an image pickup apparatus is characterized by the following arrangement.

An image pickup apparatus comprises image pickup means, calculation means for calculating a plurality of color temperature data by using a color signal in a color video signal output from an output terminal of the image pickup means, selection means for selecting one of the plurality of color temperature data, and white balance correction means for correcting white balance of the color video signal by using the color temperature data selected by the selection means.

As described above, since one of a plurality of color temperature data can be selected, effective white balance correction can be performed by using optimal color temperature data with respect to various types of photographic frames, thus minimizing the influence of a chromatic object on any one of various types of photographic frames.

Furthermore, according to the third aspect of the present invention, an image pickup apparatus is characterized by the following arrangement.

An image pickup apparatus comprises image pickup means, white balance correction means for correcting white balance of a color video signal output from an output terminal of the image pickup means, and switching means for switching a mode of the white balance correction means between a plurality of modes having difference correction speeds.

As described above, by switching the mode of the white balance correction means between a plurality of modes having different correction speeds, white balance correction can be performed at an optimal speed under various conditions. Therefore, both excellent tracking characteristics and high stability can be obtained, and the influence of a chromatic object can be reduced to realize stable, proper white balance correction with only a small correction error.

Moreover, according to the fourth aspect of the present invention, an image pickup apparatus is characterized by the following arrangement.

An image pickup apparatus comprises image pickup means, detection means for detecting color data from a color video signal corresponding to each of a plurality of regions of a photographic frame of the image pickup means, white balance correction means for correcting white balance of a color video signal output from an output terminal of the image pickup means by using color data output from the detection means, and switching means for switching a mode of the white balance correction means between a first mode in which color data of all the regions can be used, and a second mode in which color data of only some of the plurality of regions can be used.

With the above-described arrangement, high-precision white balance control is performed in the first mode in a normal operation, whereas white balance correction with good tracking characteristics can be performed in the second mode in a case wherein an abrupt change in color temperature occurs.

Other objects and advantages besides those discussed above shall be apparent to those skilled in the art from the description of a preferred embodiment of the invention which follows. In the description, reference is made to the accompanying drawings, which form a part hereof, and which illustrate examples of the invention. Such examples, however, are not exhaustive of the various embodiments of the invention, and therefore reference is made to the claims which follow the description for determining the scope of the invention.

BRIEF DESCRIPTION OF THE DRAWINGS

FIGS. 3A1, 3A2, 3B1, 3B2, 3C1, and 3C2 are views for explaining problems posed in white balance correction based on the white extraction scheme;

FIG. 6 is a table for explaining a sequence of loading of data from the divided regions in the apparatus in FIG. 4;

FIG. 8 is a view for explaining frame division, data of each divided region, and color change detection regions in the image pickup apparatus in FIG. 7;

FIGS. 16A to 16C are views showing a change in the object to explain the effect of the apparatus in FIG. 7;

FIG. 23 is a table showing shift conditions for the four operation modes for white balance correction in FIG. 22;

FIG. 30 is a view showing specific regions from which integral data are loaded in the image pickup apparatus in FIG. 28;

FIG. 31 is a table showing a sequence of loading of integral data of the respective signals from the specific regions shown in FIG. 30;

FIG. 32 is a view showing other specific regions from which integral data are loaded in the image pickup apparatus in FIG. 28; and FIG. 33 is a table showing a sequence of loading of the integral data of the respective signals of the specific regions shown in FIG. 32.

DETAILED DESCRIPTION OF THE PREFERRED EMBODIMENTS

Embodiments of the present invention will be described in detail below with reference to the accompanying drawings.

(First Embodiment)

Figure 7:
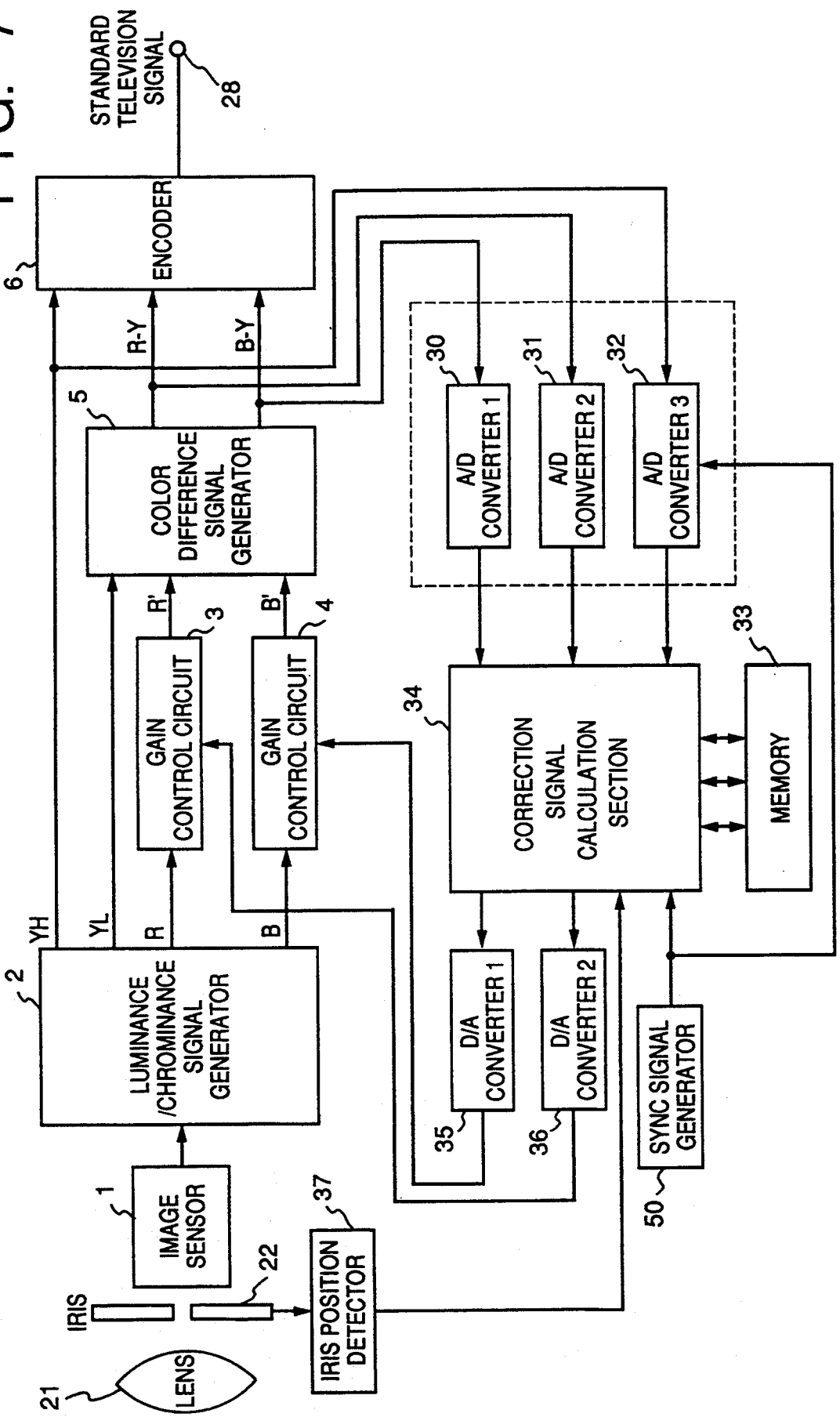
FIG. 7 is a block diagram showing a schematic arrangement of an image pickup apparatus according to the first and second embodiments of the present invention.

FIG. 7 is a block diagram showing a schematic arrangement of an image pickup apparatus according to the first embodiment of the present invention. The same reference numerals in FIG. 7 denote the same parts as in FIG. 2, and a detailed description thereof will be omitted.

Referring to FIG. 7, reference numeral 30 denotes an analog/digital (A/D) converter for converting a color difference signal (B−Y) from an analog value to a digital value; 31, an A/D converter for converting a color difference signal (R−Y) from an analog value to a digital value; and 32, an A/D converter for converting a $Y_H$ signal from an analog value to a digital value.

Reference numeral 33 denotes a memory for storing outputs from the A/D converters 30, 31, and 32; and 34, a correction signal calculation section for calculating a white balance correction signal. The correction signal calculation section 34 is constituted by a processor such as a microcomputer.

Reference numeral 35 denotes a D/A converter for converting a B (blue) gain-corrected signal, output from the correction signal calculation section 34, from a digital value to an analog value; and 36, a D/A converter for converting an R (red) gain-corrected signal, output from the correction signal calculation section 34, from a digital value to an analog value.

In this case, a sync signal for providing a timing required for an operation is supplied from a sync signal generator 50 to the A/D converters 30, 31, and 32 and to the correction signal calculation section 34. It is apparent that this sync signal is synchronized with a color video signal output from an image sensor.

Since the A/D converters 30, 31, and 32 and the correction signal calculation section 34 operate in accordance with the sync signal, (B−Y), (R−Y), and $Y_H$ signals can be divided into small regions for each frame, as shown in FIG. 8. The correction signal calculation section 34 calculates the average values of the (B−Y), (R−Y), and $Y_H$ signals in each region. As shown in FIG. 8, the average value of each (B−Y) signal in each of 8×8 regions, i.e., 64 regions is represented by Bn (n=1 to 64); the average value of each (R−Y) signal, Rn (n=1 to 64); and the average value of each $Y_H$ signal, YHn (n=1 to 64).

The correction signal calculation section 34 further calculates the above-mentioned x and y components for each region. That is, xn=Rn−Bn=(R−Y)n−(B−Y)n, and yn=Rn+Bn=(R−Y)n+(B−Y)n.

In this case, white extraction is performed, similar to the prior art previously described. In this embodiment, only signal components in regions which satisfy the following conditions ①, ②, and ③ are extracted.

Figure 1:
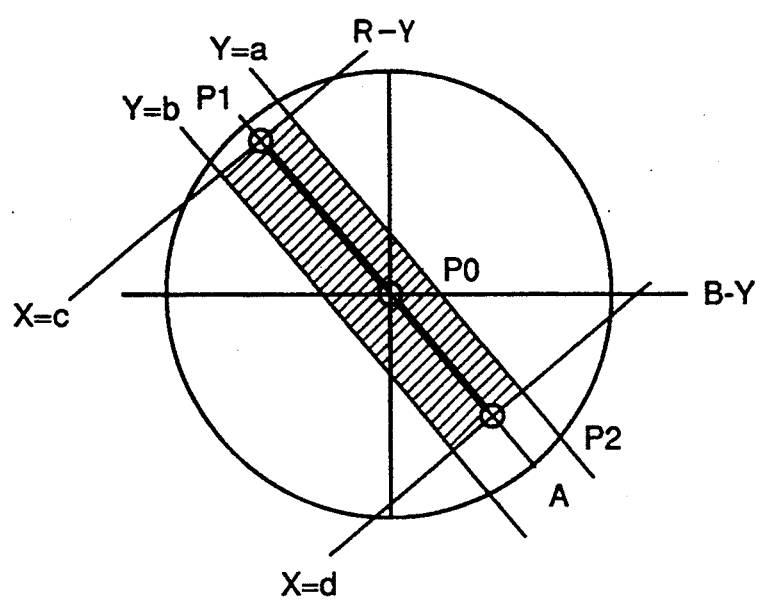
FIG. 1 is a graph for explaining a signal extraction range in a white extraction scheme.

Condition ① is b≦yn≦a, where a and b are the same as the values a and b in FIG. 1. Condition ② is d≦xn≦c, where c and d are the same as the values c and d in FIG. 1. Condition ③ is e≦YHn≦f, where e and f are values for removing low- and high-luminance color-omitted portions.

Figure 9:
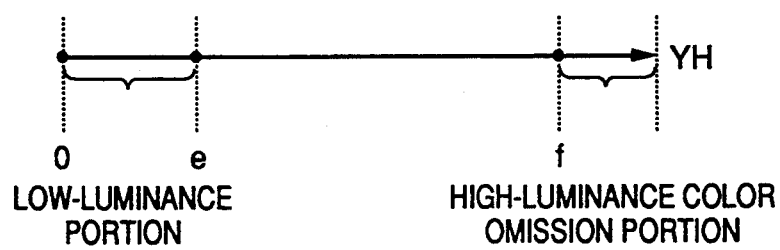
FIG. 9 is a view for explaining criteria of color omission in the image pickup apparatus in FIG. 7.

FIG. 9 is a view for explaining the values e and f for determining color omission. The coordinates in FIG. 9 represent the levels of the $Y_H$ signal. As shown in FIG. 9, when the level of the $Y_H$ signal falls within the range of 0 to the value e or exceeds the value f, it is determined that color omission occurs, and extraction of the above-mentioned signals is not performed.

Assume that the total values of the average values Rn and the average values Bn extracted, by the above-described white extraction, from the data groups in the plurality of regions into which one frame are divided is represented by Rtotal and Btotal, respectively. In this case, these total values Rtotal and Btotal are divided by a value m representing the number of regions subjected to white extraction to obtain values Ravr and Bavr, respectively. That is, these values Ravr and Bavr are respectively represented by Ravr=Rtotal/m and Bavr=Btotal/m.

The correction signal calculation section 34 compares the values Ravr and Bavr with the above-mentioned reference potentials (reference values) Rref and Bref, and calculates correction data such that the value Ravr and Bavr become equal to the reference values Rref and Bref, respectively.

Figure 10:
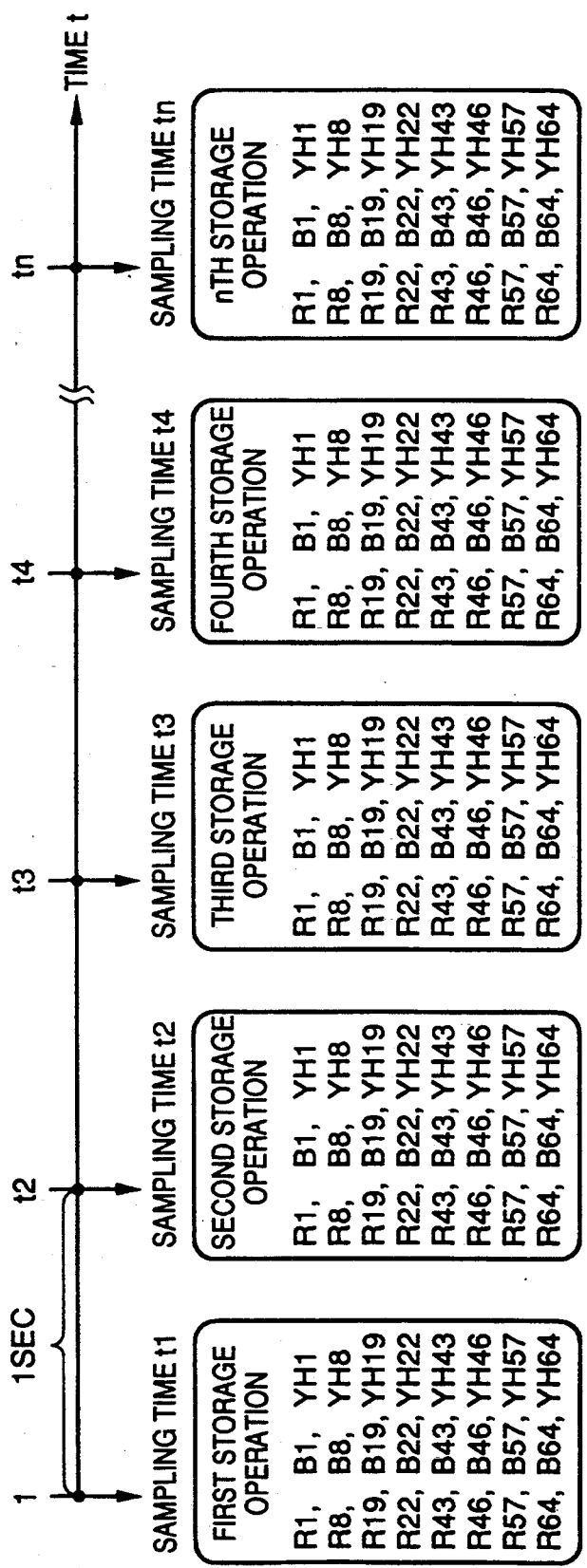
FIG. 10 is a view for explaining a sampling period of data for color change detection in the image pickup apparatus in FIG. 7.

In the correction signal calculation section 34, the data of Rn, Bn, and YHn in a plurality of predetermined regions of the divided regions are stored in the memory 33. In this embodiment, the data of Rn, Bn, and YHn in the eight regions indicated by the hatching in FIG. 8 are stored in the memory 33 at predetermined time intervals. Note that in the embodiment, as shown in FIG. 10, the values Rn, Bn, and YHn of the above-mentioned eight regions are stored every second. That is, a sampling operation is performed every second to store the following eight sets of data, a total of 24 data, in the memory 33: (R1, B1, YH1), (R8, B8, YH8), (R19, B19, YH19), (R22, B22, YH22), (R43, B43, YH43), (R46, B46, and YH46), (R57, B57, YH57), and (R64, B64, YH64).

Subsequently, the correction signal calculation section 34 compares the past data stored in the memory 33 with the current data to determine a change in color temperature. A method of performing such determination will be described in detail below.

Determination of a change in color temperature is performed by detecting changes in color in each region. Assume that the current time is time t3 in FIG. 10. In this case, detection of changes in color is performed by calculating the differences between the 24 data sampled at time t3 and the 24 data sampled at time t2 and stored in the memory 33.

Let R1 (t2) be the value of R1 sampled at time t2, and R1(t3) be the value of R1 sampled at time t3. In this case, a difference $\Delta R1$ between the two values is represented by $R1(t3)-R1(t2)$. If $\Delta B1$, $\Delta R8$, ... are defined in the same manner, the following eight sets of difference, a total of 16 differences, can be obtained: ($\Delta R1$, $\Delta B1$), ($\Delta R8$, $\Delta B8$), ($\Delta R19$, $\Delta B19$), ($\Delta R22$, $\Delta B22$), ($\Delta R43$, $\Delta B43$), ($\Delta R46$, $\Delta B46$), ($\Delta R57$, $\Delta B57$), and ($\Delta R64$, $\Delta B64$).

Figure 11:
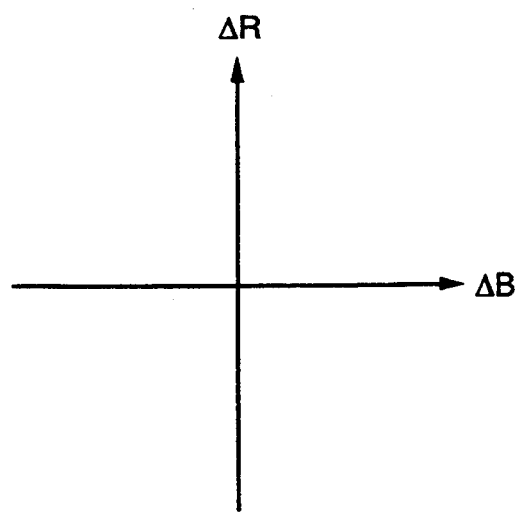
FIG. 11 is a graph for explaining a coordinate system used for determining a change in color temperature on the basis of color change detection values.
Figure 12:
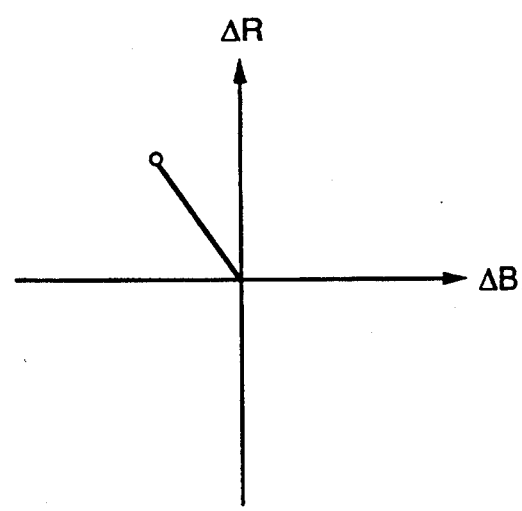
FIG. 12 is a graph for explaining a state of a decrease in color temperature with reference to the coordinate system in FIG. 11.
Figure 13:
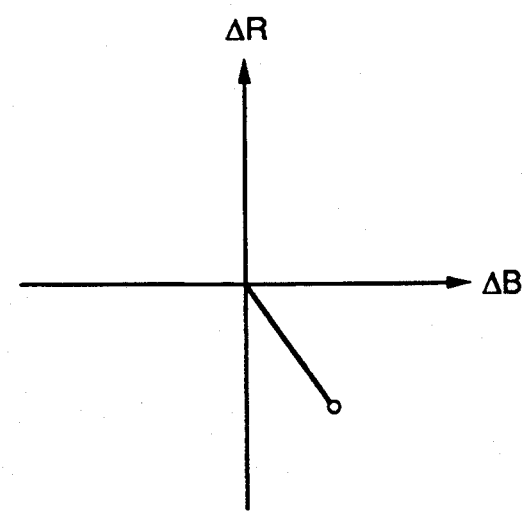
FIG. 13 is a graph for explaining a state of an increase in color temperature with reference to the coordinate system in FIG. 11.

FIGS. 11 to 13 are graphs for explaining a method of determining a change in color temperature on the basis of these color change detection values. FIG. 11 is a graph for explaining coordinates used for this determination. FIG. 12 is a graph for explaining a state of a decrease in color temperature with reference to the coordinates in FIG. 11. FIG. 13 is a graph for explaining a state of an increase in color temperature with reference to the coordinates in FIG. 11.

In determination of a change in color temperature, the respective sets of differences are converted into values on a two-dimensional coordinate plane constituted by coordinates $\Delta R$ and $\Delta B$ and shown in FIG. 11. Assume that the color temperature of a light source for radiating light on the entire frame changes to a low color temperature in the interval between time t2 and time t3. In this case, all the values $\Delta R$ in the eight regions change to positive values, and all the values $\Delta B$ change to negative values. For this reason, the vector of ($\Delta R$, $\Delta B$) is on the second quadrant of the coordinate system in FIG. 11, as shown in FIG. 12. When the color temperature of the light source for radiating light on the entire frame changes to a high color temperature in the interval between time t2 and time t3, the vector of ($\Delta R$, $\Delta B$) is on the fourth quadrant of the coordinate system in FIG. 11, as shown in FIG. 13.

Assume that since the brightness of an object to be photographed is considerably low or high, color omission occurs. In this case, even if the color temperature of the light source changes, the color component does not greatly change. Therefore, the values $\Delta R$ and $\Delta B$ corresponding to such high and low brightness levels are not considered. In this case, the above-mentioned values YHn(t2) and YHn(t3) are used to perform determination of high and low brightness levels.

Figure 14:
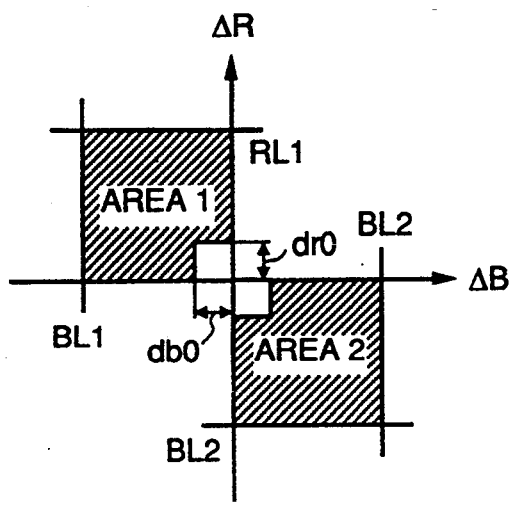
FIG. 14 is a graph showing color temperature change determination regions in the coordinate system in FIG. 11.

FIG. 14 is a graph showing color temperature change determination regions in the coordinate system in FIG. 11. More specifically, when the color temperature of the light source changes to a low value, all the regions defined by the values $\Delta R$ and $\Delta B$, from which regions corresponding to the above-mentioned high and low brightness levels are excluded, are present in an area 1 in FIG. 14. In contrast to this, when the color temperature of the light source changes to a high value, all the regions are present in an area 2 in FIG. 14. Therefore, a change in color temperature is determined by checking whether all the regions are present in the area 1 or 2.

Figure 15:
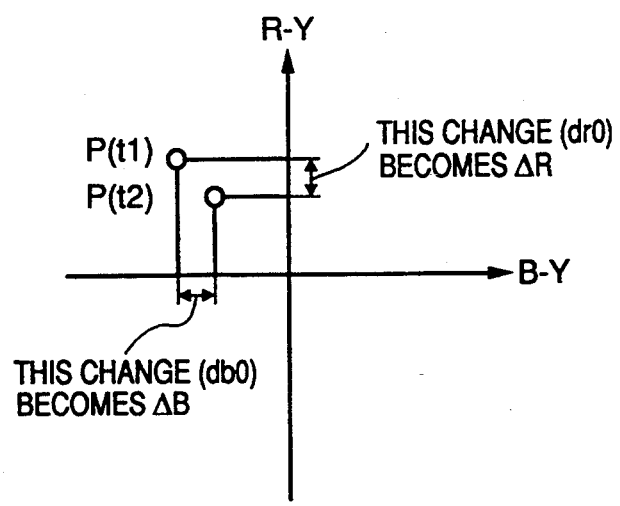
FIG. 15 is a graph for explaining a change in color image signal due to maximum white balance correction in the apparatus in FIG. 7.

In this case, the areas 1 and 2 are set in consideration of the fact that white balance correction is performed even while determination of a change in color temperature is performed. Assume that an output color image signal changes from a point P(t1) to a point P(t2) at maximum in a second, as shown in FIG. 15, owing to white balance correction performed during determination of a change in color temperature. In this case, the sampled differences $\Delta R$ and $\Delta B$ also change by amounts (dr0, db0) by which white balance is performed. These maximum changes in dr0 and db0 accompanying white balance correction are not caused by a change in the light source or a change in the object. For this reason, the determination areas (areas 1 and 2) for determining a change in color temperature must be set to exclude changes in these values dr0 and db0.

Both the areas 1 and 2 shown in FIG. 14, therefore, are set to exclude a region in which the absolute value of $\Delta R$ is less than the value dr0, and a region in which the absolute value of $\Delta B$ is less than the value db0. With this setting, operation errors can be further reduced.

Figure 17:
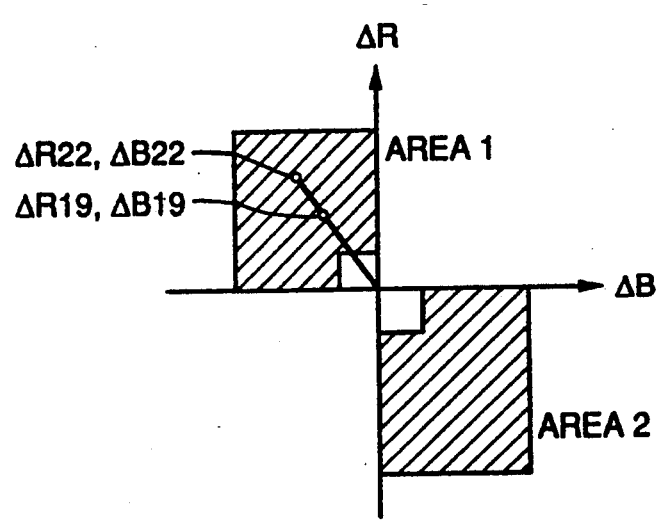
FIG. 17 is a graph for explaining an operation of determining a change in color temperature in the state shown in FIGS. 16A to 16C.

Assume that no change in color temperature occurs in the interval between time t1 and time t3, and the object changes, as shown in FIGS. 16A to 16C. In this case, the values $\Delta R$ and $\Delta B$ at time t2 are set as follows. ($\Delta R22$, $\Delta B22$) and ($\Delta R19$ and $\Delta B19$) are set in the area 1 shown in FIG. 17. However, all the other sets ($\Delta R1$, $\Delta B1$), ($\Delta R8$, $\Delta B8$), ($\Delta R43$, $\Delta B43$), ($\Delta R46$, $\Delta B46$), ($\Delta R57$, $\Delta B57$), and ($\Delta R64$, $\Delta B64$) become (0, 0) and hence are not present in the area 1. It is, therefore, determined that any change in color temperature has not occurred.

In the embodiment, when the above-mentioned color change detection values ($\Delta R$, $\Delta B$) in the regions, of the eight regions described above, excluding the regions corresponding to high and low brightnesses, are all set in the area 1 or 2, a change in color is determined. Note that if an omission of determination of a change in color due to generation of noise, a special pattern of a change in object, or the like is to be considered, the apparatus may be designed such that a change in color is determined when almost all the regions except for the regions corresponding to the high and low brightness levels are set in the area 1 or 2.

In the image pickup apparatus of the embodiment, such determination of a change in color temperature is performed, and white balance correction is stopped or started in accordance with this color temperature change determination result, thereby greatly reducing the above-described operation errors.

A white balance control operation of the embodiment using this color temperature change determination result will be described below with reference to the flow chart shown in FIG. 18.

Figure 18:
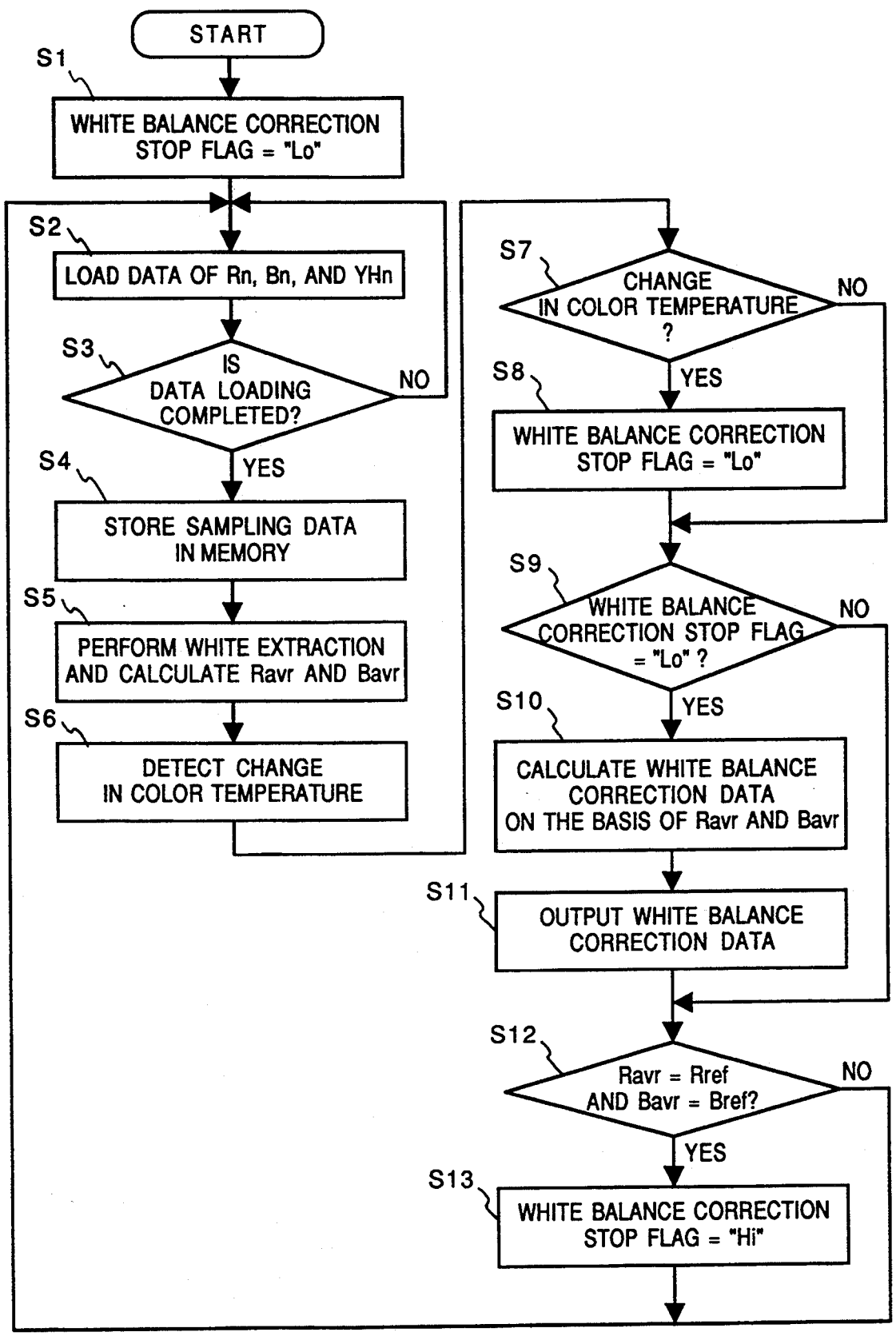
FIG. 18 is a flow chart for explaining an operation of the image pickup apparatus of the first embodiment.

The flow chart in FIG. 18 is started when the power switch is turned on or the image pickup apparatus is set in a standby state. In step S1, however, the flow chart is started in a state wherein a white balance correction stop flag is set to "Lo" to allow white balance correction. When the data of Rn, Bn, and YHn in all the divided regions 1 to 64 shown in FIG. 8 are loaded in step S2, it is checked whether this data loading operation is completed (step S3). The flow then advances to step S4.

In step S4, the data of Rn, Bn, and YHc in the eight regions indicated by the hatching in FIG. 8 are stored. In step S5, the above-described white extraction processing is performed to obtain the average values Ravr and Bavr of the data of Rn and Bn in the corresponding regions.

In step S6, the above-described determination of a change in color temperature is performed. If it is determined in step S7 that a change in color temperature has occurred, the white balance correction stop flag is set to "Lo" in step S8. If it is determined in step S9 that the white balance correction stop flag is set to "Lo" white balance correction is performed in steps S10 and S11.

More specifically, correction data which allow the average values Ravr and Bavr to coincide with the reference values Rref and Bref are calculated in step S10. In step S11, the correction data are respectively output to the D/A converters 35 and 36.

In step S12, it is checked whether the average values Ravr and Bavr are almost equal to the reference values Rref and Bref, respectively. Only when Ravr=Rref and Bavr=Bref, the white balance correction stop flag is set at "Hi" to designate a white balance correction stop operation. The flow then returns to step S2. The white balance correction stop flag is kept "Hi" to stop white balance correction unless a change in color temperature is determined in step S7. Unless it is determined in step S9 that the white balance correction stop flag is set to "Lo", steps S10 and S11 are bypassed to stop white balance correction.

The processing in steps S2 to S13 in FIG. 18 is performed at a period of one second. If, however, white balance correction is to be performed at a shorter period, only steps S4, S6, and S7 may be performed at a period of one second while the remaining steps are performed, for example, every 1/10 seconds.

With this arrangement, in the image pickup apparatus of the embodiment, if it is determined that no change in color temperature has occurred while good white balance is maintained, white balance correction is stopped regardless of the state of an object to be photographed, thereby preventing visually disturbing color reproduction accompanying an operation error in the white balance correction circuit.

Assume that a change in object, such as the one shown in FIGS. 3A1, 3A2, 3B1, 3B2, 3C1, and 3C2, has occurred. In this case, as long as good white balance is maintained in the state shown in FIGS. 3A1 and 3A2, even if the object changes as shown in FIGS. 3B1 and 3C1, the white balance is not changed, and the photographic operation can be continued under the good white balance without causing an operation error.

A modification of the first embodiment will be described next with reference to FIGS. 19 to 20C. In the above embodiment, the ranges of changes in a color signal, set for determination of a change in color temperature, are set as the areas 1 and 2 shown in FIG. 14, and are set as if they are constant.

In contrast to this, in the modification which will be described below, the ranges of changes in a color signal are changed. More specifically, the detection ranges of changes in a color signal, used for determination of a change in color temperature, are changed in accordance with a white balance correction ratio. FIG. 19 shows such a state.

Figure 19:
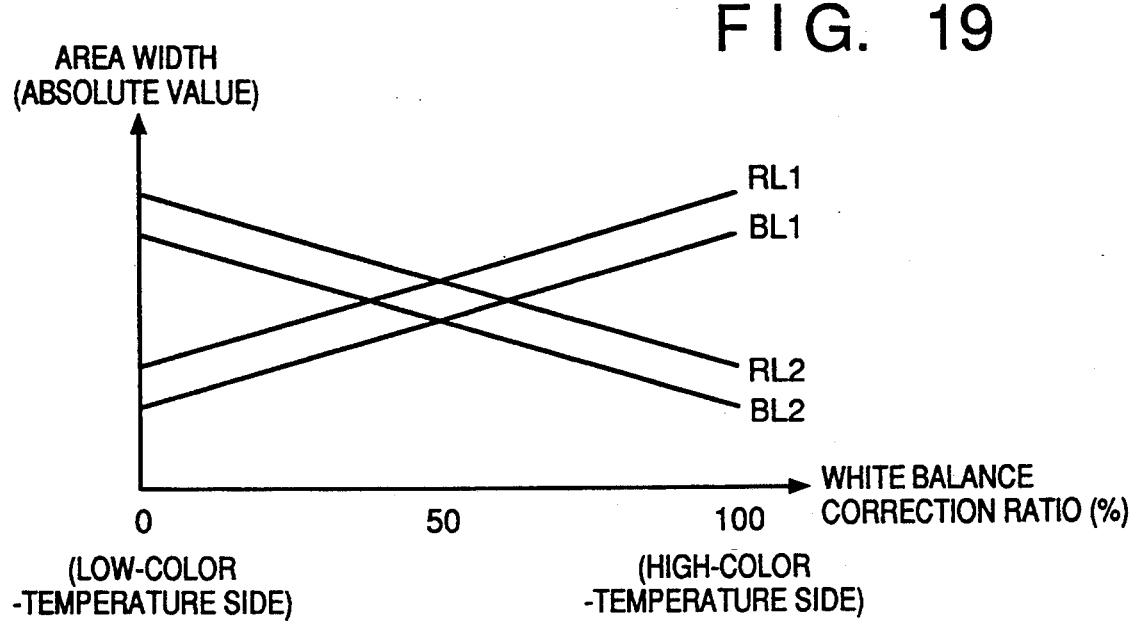
FIG. 19 is a graph showing a state in which color signal change ranges set for determining a change in color temperature are changed in accordance with a white balance correction ratio.

The white balance correction ratio in FIG. 19 relatively indicates how a white balance correction value corresponds to a color temperature. Assume that the range of color temperatures, in which white balance correction is performed, is set between 10,000° K. corresponding to an outdoor condition and 3,000° K. corresponding to a low-brightness indoor condition under which a photographic operation can be performed. In this case, when the current white balance correction value corresponds to 10,000° K., the white balance correction ratio is defined as 100%, and when the current white balance correction value corresponds to 3,000° K., the white balance correction ratio is defined as 0%.

Figure 20A:
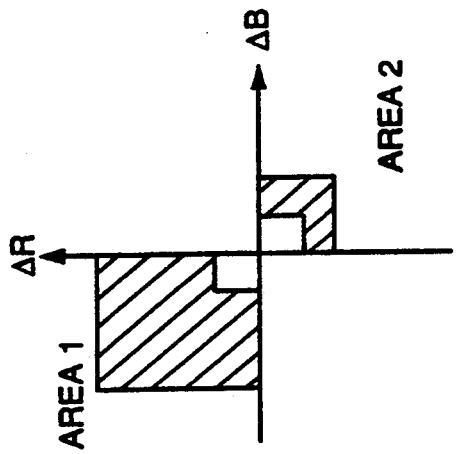
FIGS. 20A to 20C are graphs showing color signal change ranges set for determining a change in color temperature, which ranges are changed in accordance with the graph in FIG. 19, in the coordinate system in FIG. 11.
Figure 20B:
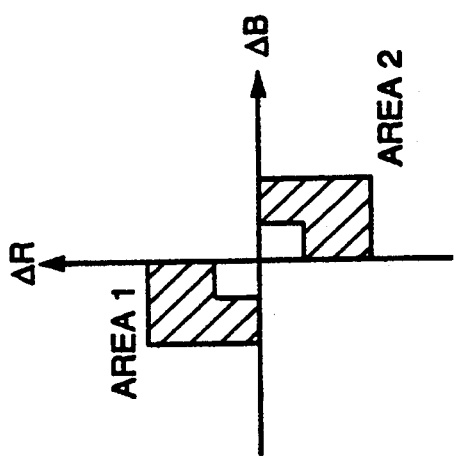
Figure 20C:
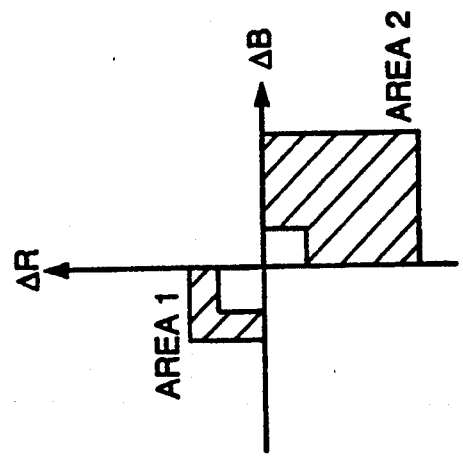

FIGS. 20A, 20B, and 20C show changes in extraction ranges of changes in color temperature, i.e., changes in the areas 1 and 2 shown in FIG. 14, on the coordinate axes in FIG. 11, when the white balance correction ratios are 0%, 50%, and 100%, respectively.

It is apparent that a specific color temperature to which a given white balance correction value corresponds can be detected from white balance correction values output to the D/A converters 35 and 36.

By changing the detection ranges of changes in color in accordance with a color temperature, the precision in determination of a change in color temperature can be further improved. Assume that a photographic operation is performed under a light source having a color temperature of 3,000° K., and this color temperature is corrected by using a white balance correction value. In this case, it is impossible in practice for the color temperature decrease. For this reason, the above-mentioned color change detection regions are set as shown in FIG. 20A to reduce the area 1. With this arrangement, even if the entire frame is tinted with orange or red during photography at a low color temperature, a change in color temperature is not determined, thus preventing an operation error.

Similarly, when a photographic operation is performed under a light source having a color temperature of 10,000° K., and this color temperature is corrected by using a white balance control value, it is impossible in practice for the color temperature increase. For this reason, the color change detection regions are set as shown in FIG. 20C to reduce the area 2. With this arrangement, even if the entire frame is tinted with blue during photography under a high color temperature, a change in color temperature is not determined, thus preventing an operation error.

In the above-described modification, operation errors associated with determination of a change in color temperature can be further reduced in this manner. Therefore, chances of operation errors in white balance correction can be further reduced.

In the apparatus of the above-described embodiment, eight regions are set as regions for detecting changes in color to determine a change in color temperature. However, the number of detection regions may be increased to improve the detection precision. In addition, the positions and number of detection regions may be changed in accordance with the state of an object to be photographed.

As described above, according to the image pickup apparatus of the first embodiment, there is provided an image pickup apparatus which is free from the influence of an object having a chromatic color, prevents a deterioration in color reproduction for the object due to erroneous white balance correction, and can perform stable, good white balance correction with only a small correction error in terms of a visual effect.

(Second Embodiment)

The second embodiment will be described next. Since the arrangement of an image pickup apparatus of the second embodiment, in the drawings, is the same as that of the image pickup apparatus of the first embodiment shown in FIG. 7, a description thereof will be omitted. Some constituent elements denoted by the same reference numerals differ in operation between the first embodiment and the second embodiment, and hence the operations of the respective constituent elements will be described below.

Figure 21:
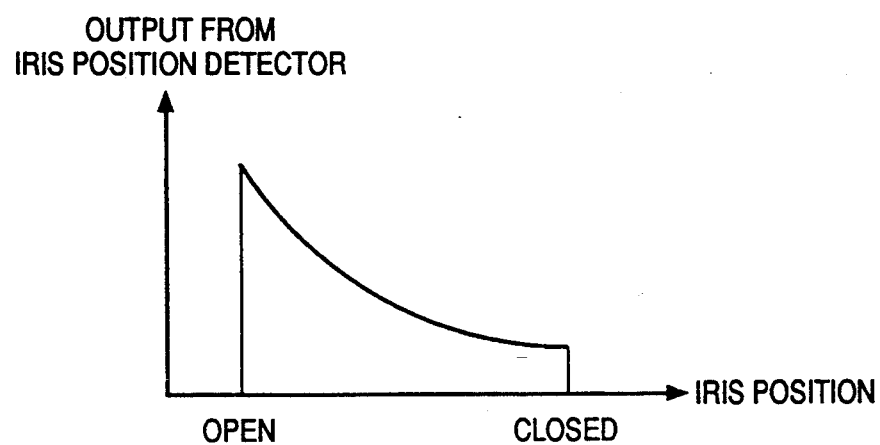
FIG. 21 is a graph for explaining the output voltage of an iris position detector in FIG. 7.

Although not described in the first embodiment, reference numeral 37 in FIG. 7 denotes an iris position detector constituted by a Hall element and the like. As shown in FIG. 21, the iris position detector 37 outputs a high detection voltage when an iris is open, and outputs a low detection voltage when the iris is closed.

The A/D converters 30, 31, and 32 and the correction signal calculation section 34 operate to devide (B−Y), (R−Y), and $Y_H$ signals into sixty four regions for each frame, as shown in FIG. 8. In this embodiment, data corresponding to eight regions vertically arranged in a line in FIG. 8 are loaded in one field. Accordingly a period of eight fields is required to load the data of the entire frame. This loading period is preferably short. Although a period of eight fields is required in the embodiment, white balance correction can be practically performed at a high speed.

The correction signal calculation section 34 performs three types of calculations (to be described below) by using average values Rn, Bn, and YHn, thus calculating different color temperature data by the respective operations. These three types of calculations will be described in detail below.

[First Calculation]

The first calculation in the correction signal calculation section 34 will be described first. This calculation is the same as the calculation to be performed by using the above-described first embodiment white extraction scheme to obtain a white balance correction value.

Assume that the total values of the average values Rn and the average values Bn extracted, by the above-described white extraction, from the data groups in the plurality of regions into which one frame is divided are represented by Rtotal (w) and Btotal (w), respectively. In this case, these total values Rtotal (w) and Btotal (w) are divided by a value m representing the number of regions subjected to white extraction to obtain values Ravr(w) and Bavr(w), respectively. That is, these values Ravr and Bavr are respectively represented by Ravr(w)=Rtotal (w)/m and Bavr (w)=Btotal (w)/m. These values Ravr (w) and Bavr (w) are color temperature data 1.

[Second Calculation]

The second calculation in the correction signal calculation section 34 will be described next.

The second calculation is performed to extract data of a region corresponding to the maximum brightness level, of the data group of the regions subjected to white extraction in the first calculation.

The values Rn and Bn in this region corresponding to the maximum brightness level are set as values R(Ymax) and B(Ymax) in the correction signal calculation section 34. These values R(Ymax) and B(Ymax) are color temperature data 2.

[Third Calculation]

The third calculation in the correction signal calculation section 34 will be described next.

The third calculation is performed to obtain the average value of the color difference signal data of the entire frame. In the embodiment, since one frame is divided into 64 regions, this average value can be obtained by the following calculation.

An average value Ravr of the color difference signals (R−Y) of the entire frame is obtained by (R1+R2+R3+R4+ ... +R64)/64. An average value Bavr of the color difference signals (B−Y) of the entire frame is obtained by (B1+B2+B3+B4+ ... +B64)/64. These values Ravr and Bavr are color temperature data 3.

In addition, the correction signal calculation section 34 selects data having the minimum value, i.e., data which minimizes the white balance correction amount, of color temperature data [Ravr(w), Bavr(w)], [R(Ymax), B(Ymax)], and [Ravr, Bavr], and compares the selected color temperature data with the above-mentioned reference potentials (reference values) Rref and Bref. The correction signal calculation section 34 then calculates correction data which causes the value Ravr(w), the value R(Ymax), or the value Ravr to coincide with the reference value Rref, and causes the value Bavr(w), the value B(Ymax), or the value Bavr to coincide with the reference value Bref, thus outputting the calculated correction data to perform white balance correction in accordance with the trace of a color temperature change.

As described above, a plurality of color temperature data are prepared to be selectively used so that proper white balance correction can be performed with respect to frames having various patterns, the number of chances of reducing the influence of a chromatic object is maximized. Note that this effect will be described in detail later.

A plurality of operation modes for white balance correction in the image pickup apparatus of the embodiment will be described next.

Figure 22:
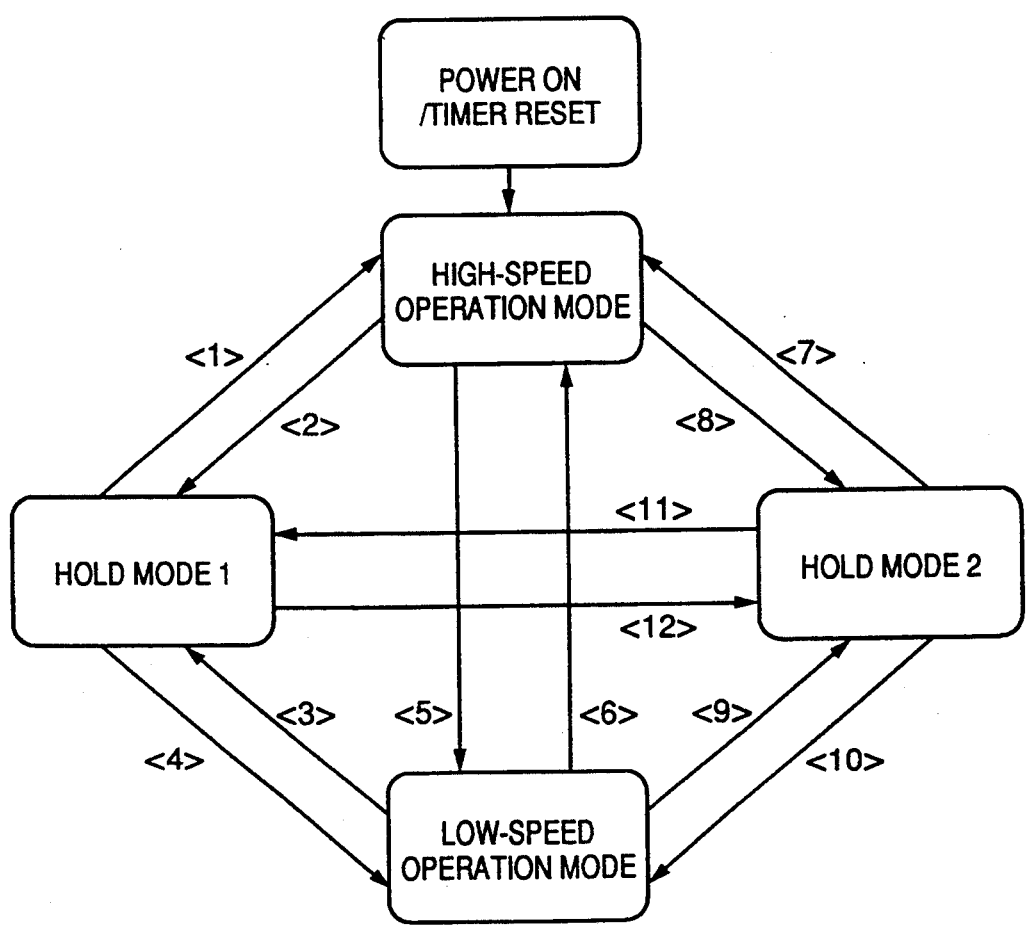
FIG. 22 is a block diagram showing operation modes for white balance correction in the image pickup apparatus of the second embodiment of the present invention, and shifts in mode.

FIG. 22 shows operation modes for white balance correction in the image pickup apparatus of the embodiment, and shifting of the modes. As shown in FIG. 22, the image pickup apparatus of the embodiment has four white balance correction modes.

Referring to FIG. 22, the high-speed operation mode is an object tracking priority mode, in which the feedback gain of white balance correction data is set to be high, and the update period is shortened, thereby correcting a white balance error within a short period of time. In contrast to this, the low-speed operation mode is a stability priority mode, in which the feedback gain of white balance correction data is decreased, and the update period is prolonged, thereby slowly correcting a white balance error.

In addition, each of hold modes 1 and 2 in FIG. 22 is a mode in which white balance correction data set immediately before the hold mode is set is held without being updated, and an apparent white balance correction operation is stopped.

Shifts <1> to <12> among the respective modes are performed by satisfying the shift conditions shown in FIG. 23. Shift conditions a to l shown in FIG. 23 will be described in detail below.

[Condition a]

Figure 24:
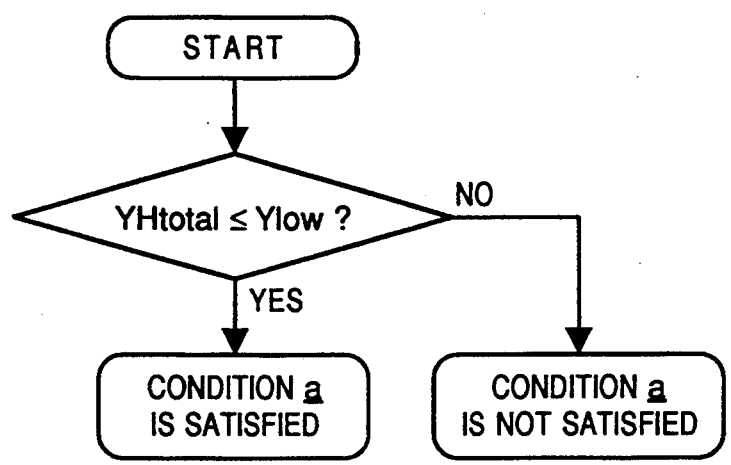
FIG. 24 is a flow chart for explaining an example of the process of determining whether a condition a of the shift conditions shown in FIG. 23 is satisfied.

The condition a is satisfied when the luminance signal level is very low, and it is determined that a total value YHtotal ($=YH1+YH2+YH3+ \ldots +YH64$) of YHn of the entire frame is smaller than a predetermined low-luminance reference value Ylow, upon comparing the value YHtotal with the low-luminance reference value Ylow, as indicated by the flow chart shown in FIG. 24. When this condition is satisfied, a mode shift for white balance correction indicated by "$<2>$", "$<3>$", or "$<11>$" in FIG. 22 is executed.

Figure 25:
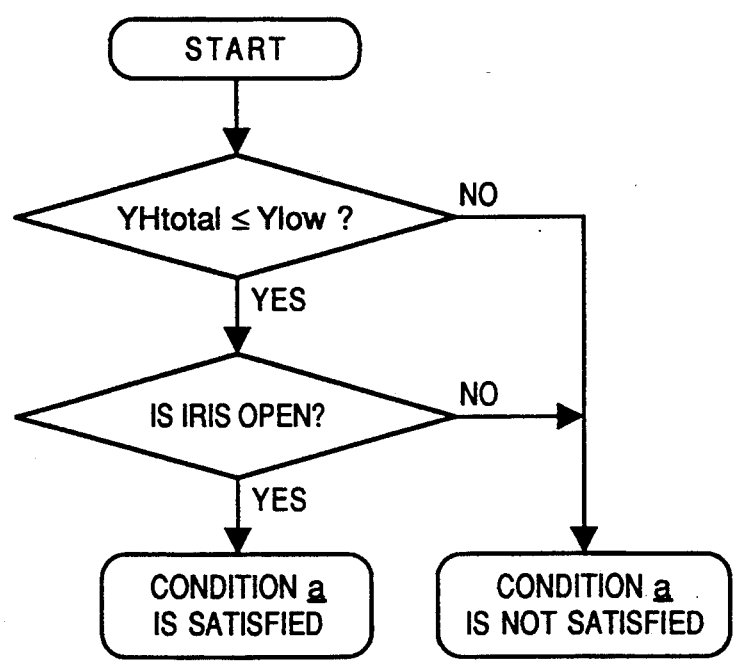
FIG. 25 is a flow chart for explaining another example of the process of determining whether the condition a of the shift conditions shown in FIG. 23 is satisfied.

Note that FIG. 25 is a flow chart showing another example of how it is determined that the condition a is satisfied. As shown in FIG. 25, the condition a may be satisfied only when the value YHtotal is lower than the low-luminance reference value Ylow, and it is detected from an output from the iris position detector 37 that an iris 22 is open.

[Condition b]

The condition b is satisfied when the state of the condition a changes. When the condition b is satisfied, the shift $<1>$ in FIG. 22 is executed. Note that the low-luminance reference value Ylow used to determine whether the condition b is satisfied is better to be set to be higher than the low-luminance reference value used to determine whether the condition a is satisfied.

[Condition c]

Figure 26:
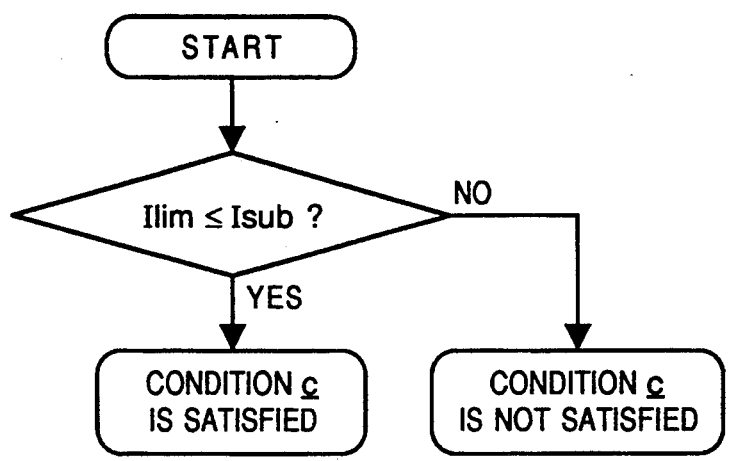
FIG. 26 is a flow chart for explaining an example of the process of determining whether a condition c of the shift conditions shown in FIG. 23 is satisfied.

The condition c is satisfied when a change in luminance level is very large. FIG. 26 shows an example of how such a decision is made. That is, in the embodiment, values detected by the iris position detector 37 are stored in a memory 33 at predetermined time intervals. As indicated by the flow chart shown in FIG. 26, a difference Isub ($=|\text{Iold}-\text{Inew}|$) between a past output value from the iris position detector 37 and a current output value Inew from the iris position detector 37 is calculated, and the difference Isub is compared with a luminance change reference value Ilim. When the difference Isub exceeds the reference value Ilim, the condition c is satisfied. When the condition c is satisfied, the shift $<10>$ in FIG. 22 is executed.

[Condition d]

When white balance correction is to be performed by using the values R(Ymax) and B(Ymax) obtained by the second calculation described above, the condition d is satisfied if it is determined that the white balance correction value is almost 0, i.e., R(Ymax)≃Rref and B(Ymax)≃Bref. When the condition d is satisfied, the shift $<8>$, $<9>$, or $<12>$ in FIG. 22 is executed.

[Condition e]

When white balance correction is to be performed by using the values Ravr and Bavr obtained by the third calculation described above, the condition e is satisfied if it is determined that the white balance correction value is almost 0, i.e., Ravr(w)≃Rref and Bavr(w)≃Bref. When the condition e is satisfied, the shift $<2>$ or $<3>$ in FIG. 22 is executed.

[Condition f]

When white balance correction is to be performed by using the values Ravr and Bavr obtained by the first calculation described above, the condition e is satisfied if it is determined that the white balance correction value is almost 0, i.e., Ravr(w)≃Rref and Bavr(w)≃Bref. When the condition f is satisfied, the shift $<2>$ or $<3>$ in FIG. 22 is executed.

[Condition g]

The condition g is satisfied when it is determined, in the same way as the first embodiment, by using the above-mentioned color difference signal data that a change in color temperature is caused. When the condition S is satisfied, the shift $<10>$ in FIG. 22 is executed as in the case wherein the condition c is satisfied.

[Condition h]

The condition h is satisfied when there is no region from which data is extracted by white extraction processing, and there is no data used for the first calculation described above. When the condition h is satisfied, the shift $<3>$ in FIG. 22 is executed.

[Condition i]

The condition i is satisfied when the values Ravr and Bavr obtained by the third calculation are not present in the white extraction area shown in FIG. 1. In a practical method of checking this, the x and y components in FIG. 1 are detected from the values Ravr and Bavr. An x component (xavr) can be calculated by (Ravr−Bavr). A y component (yavr) can be calculated by (Ravr+Bavr). The condition i is satisfied when positions on FIG. 1 which correspond to the calculated components xavr and yavr fall outside the range indicated by the hatching, i.e., at least one of inequalities, xavr<d, c<xavr, yavr>b, and a<yavr, is satisfied. When the condition i is satisfied, the shift $<3>$ in FIG. 22 is executed.

[Condition j]

The condition j is a condition for limiting the operation time in the high-speed operation mode, and is satisfied when a predetermined period of time has elapsed after the high-speed operation mode is set. That is, when the shift $<1>$ or $<7>$ in FIG. 22 is executed, i.e., the high-speed operation mode for white balance correction is set after the condition b or k is satisfied, a timer incorporated in the correction signal calculation section 34 is started. When the counted time of the timer reaches a predetermined time, the condition j is satisfied. When the condition j is satisfied, the shift $<5>$ in FIG. 22, i.e., a shift from the high-speed operation mode for white balance correction to the low-speed operation, is executed.

[Condition k]

When both the condition c (large luminance level change) and the condition g (color temperature change) are satisfied, a shift from the hold mode 2 to the low-speed operation mode is performed. When the condition k is satisfied, the shift $<1>$, $<6>$, or $<7>$ in FIG. 22 is executed to quickly set the high-speed operation mode.

[Condition l]

The condition l is satisfied when none of the conditions e, f, h, and i are satisfied. In this case, the shift $<4>$ in FIG. 22 is executed.

Shifting of the operation modes for white balance correction is determined in accordance with the shift conditions a to l described above, as shown in FIGS. 22 and 23. As is apparent from FIG. 22, when the power switch is turned on, the above-mentioned timer is reset, and the high-speed operation mode is set. As for white balance correction data, a value corresponding to a light source having a high color temperature is set as an initial value, and is gradually changed afterward.

According to the embodiment described above, once an operation mode is shifted to a hold mode, no white balance correction is performed unless a shift condition for a restarting operation is satisfied. Therefore, erroneous white balance correction based on only a change in object can be prevented. When white balance correction is restarted, the correction is performed at the optimal operation speed corresponding to the state of an object in accordance with the shift condition for the restarting operation. The white balance correction is not easily influenced by a color change in object, and good tracking characteristics corresponding to photographic conditions.

Such effects of the embodiment will be described below with reference to several practical examples of white balance correction performed in accordance with the states of objects.

First Example

Figure 2:
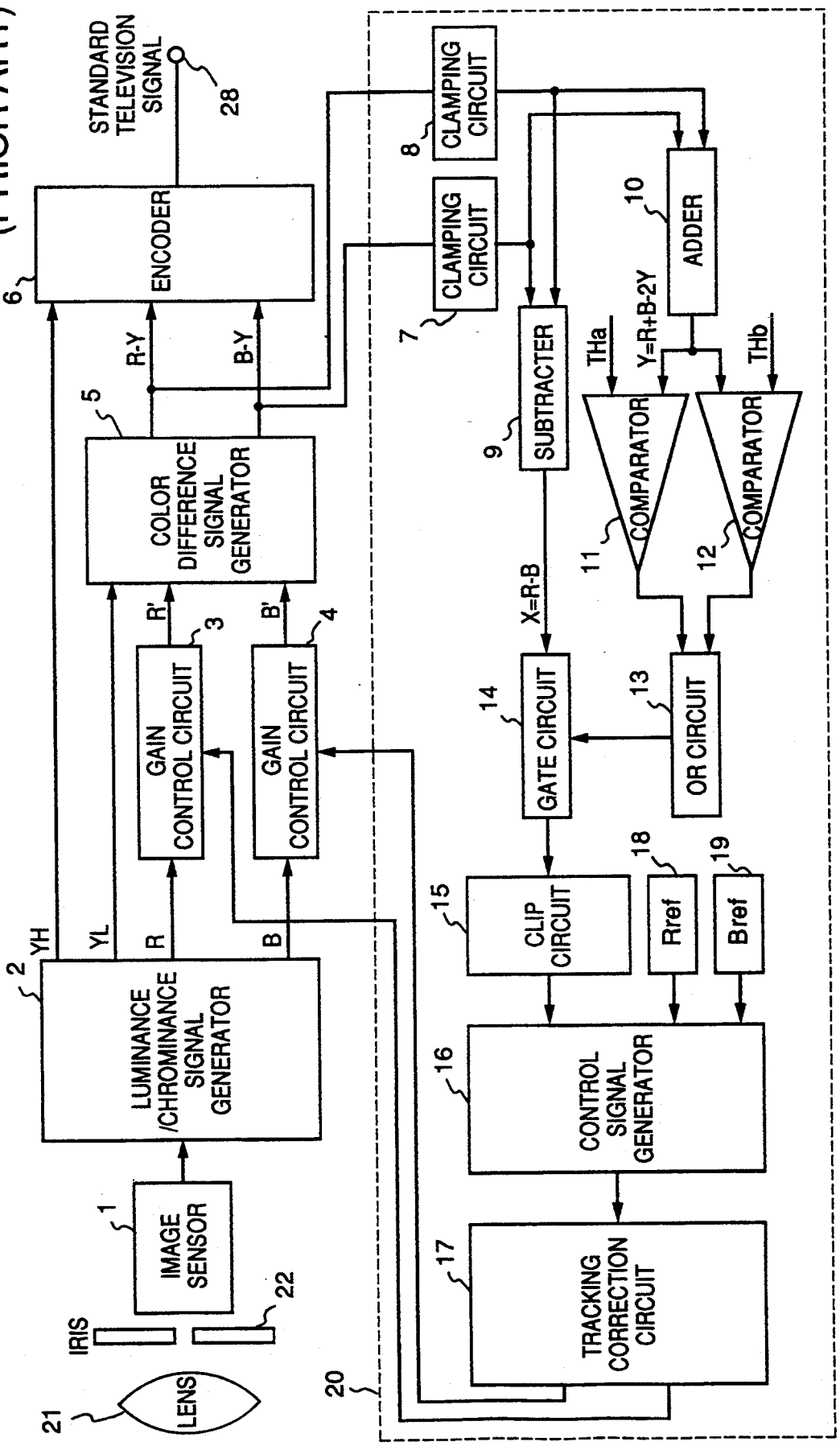
FIG. 2 is a block diagram showing the arrangement of a main part of a conventional image pickup apparatus designed to perform white balance correction by the white extraction scheme.

Consider first a case wherein the object change shown in FIGS. 3A1, 3B1, and 3C1 has occurred. In the state shown in FIG. 3A1, since color difference signal components such as those shown in FIG. 3A2 are present, all the data [Ravr(w), Bavr(w)], [R(Ymax), B(Ymax)], and [Ravr, Bavr] obtained by the first to third calculations described above are almost equal to the reference potentials Rref and Bref. Therefore, all the shift conditions d, e, and f are satisfied, and each of the shifts <2>, <3>, <8>, <9> and <12> in FIG. 22 is executed, thus setting white balance correction in the hold mode 2.

Even if the object changes as shown in FIGS. 3B1 and 3C1 in this state, none of the shift conditions a, c, g, and k are satisfied, and none of the shifts <7>, <10>, and <11> in FIG. 22 are executed. That is, the hold mode 2 is maintained, and the state of the white balance correction is stabilized in the state shown in FIG. 3B2. Therefore, no erroneous correction is performed, unlike white balance correction of the conventional white extraction scheme.

Assume that the color temperature of the light source changed while the state of this white balance correction is stabilized in the state shown in FIG. 3B2. In this case, since the color temperature change is determined by the above-described method, the shift condition g is satisfied, and the shift <10> in FIG. 22 is executed. As a result, the white balance correction is shifted to the low-speed operation mode. With this operation, the white balance correction is restarted to perform correction in accordance with the new color temperature of the light source.

Second Example

A case wherein a human figure with a green background is to be photographed will be described next. In this case, the color difference signal vector associated with the background is indicated by "Pg" in FIG. 27A, and the color difference signal vector associated with the human figure is indicated by "Ph" in FIG. 27A. When white balance correction of the conventional white extraction scheme is performed in such a state, only the skin color component indicated by "Ph" is extracted, and the color difference signal is corrected by the white balance correction, as shown in FIG. 27B. As a result, the skin color is faded to almost white.

Figure 27C:
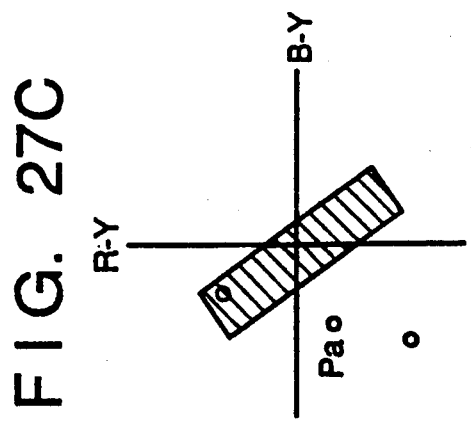
FIGS. 27A to 27C are graphs for explaining white balance correction with respect to the object with a green background.
Figure 27B:
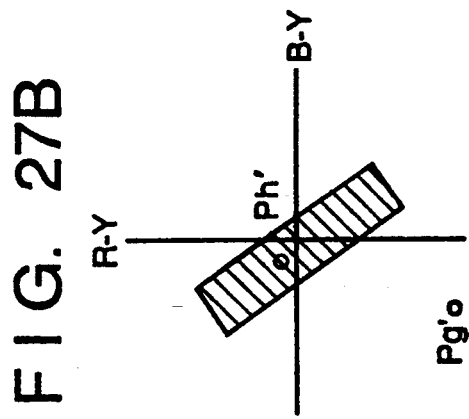
Figure 27A:
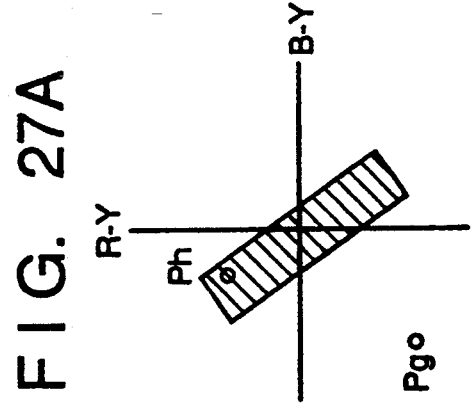

In contrast to this, in the image pickup apparatus of the embodiment, when the values Ravr and Bavr of the entire frame are obtained by the above-described third calculation, the vector indicated by "Pa" in FIG. 27C is obtained, and it is determined that the Pa point is located outside the white extraction area. As a result, the shift condition i described above is satisfied, and the hold mode 1 is set. Therefore, no change occurs in the state shown in FIG. 27A, and the operation is stabilized in this state.

Third Example

A case wherein the photographic state changes from an indoor state to an outdoor state will be described below. In this case, since both the change in luminance and the change in the color temperature of the light source are large, white balance correction must be quickly performed. In the embodiment, when a large luminance change and a large color temperature change have occurred, the shift condition k described above is satisfied. The shift <1>, <6>, or <7> in FIG. 22 is then executed regardless of a mode set for white balance correction at this point of time. When the shift <1>, <6>, or <7> in FIG. 22 is executed, the white balance correction is shifted to the high-speed operation mode, thus quickly setting a white balance state corresponding to the outdoor color temperature.

Subsequently, when the high-speed operation mode continues for a predetermined period of time, the above-described shift condition j is satisfied. As a result, the white balance correction is temporarily shifted to the low-speed operation mode, and a shift to an operation mode is performed in accordance with the state of an object.

Fourth Example

Consider next a case wherein the power switch is turned on to erroneously start white balance correction while the lens cap is put on, and the lens cap is removed afterward. In this case, while the lens cap is kept on, the shift condition a is satisfied, and hence the hold mode 1 is set as an operation mode for white balance correction. However, when the lens cap is removed, the shift condition b is satisfied. For this reason, the shift <1> in FIG. 22 is executed to shift the white balance correction to the high-speed operation mode. After the lens cap is removed, the white balance can be quickly matched with the color temperature of a light source.

In the apparatus of the second embodiment, when the average of color signal data of the entire frame is to be calculated, data associated with the 64 divided regions are extracted, and the average of these data is calculated. However, if data are uniformly distributed on the entire frame, only the data of some of the regions may be extracted to calculate the average of the data of these regions.

The eight regions indicated by the hatching in FIG. 8 are set as regions in which changes in color are detected to determine a change in color temperature. If, however, data are uniformly distributed on the entire frame, the number of such regions may be changed. In addition, the positions and number of detection regions may be changed in accordance with the state of an object.

According to the image pickup apparatus of the second embodiment described above, since one of a plurality of color temperature data can be selected, proper white balance correction can be performed with respect to various photographic frames by using optimal color temperature data. Therefore, the influence of a chromatic object on any types of frame configurations can be minimized. In addition, since the mode of the white balance correction apparatus can be switched between a plurality of modes having different correction speeds, both good tracking characteristics and high stability can be obtained. Furthermore, the influence of a chromatic object can be reduced to realize stable, proper white balance correction without a correction error.

(Third Embodiment)

The third embodiment will be described next.

Figure 28:
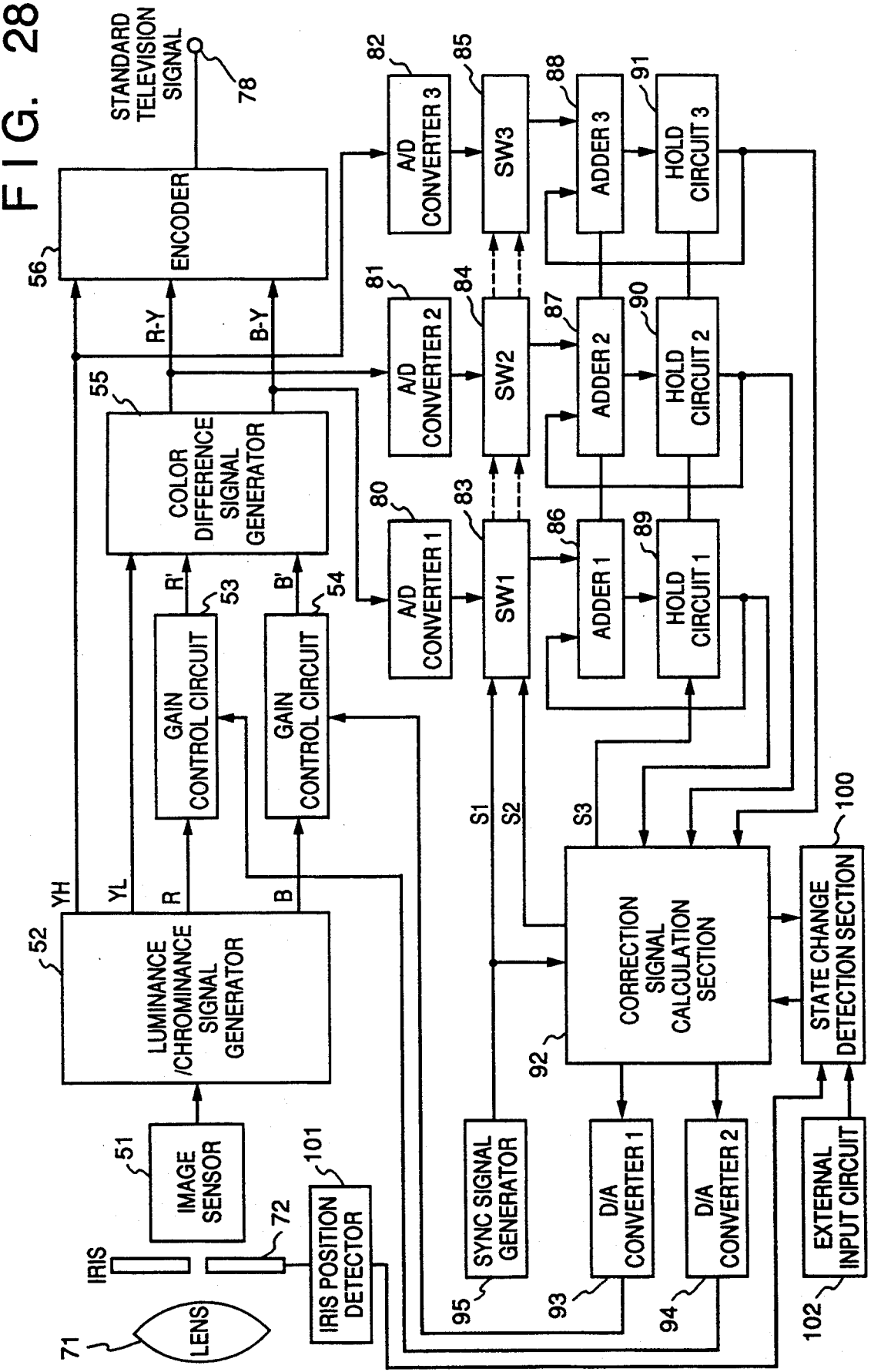
FIG. 28 is a block diagram showing a schematic arrangement of an image pickup apparatus of the third embodiment.

FIG. 28 is a block diagram showing a schematic arrangement of an image pickup apparatus of the third embodiment. The same reference numerals in FIG. 28 denote the same parts as in FIG. 4, and a detailed description thereof will be omitted.

Figure 4:
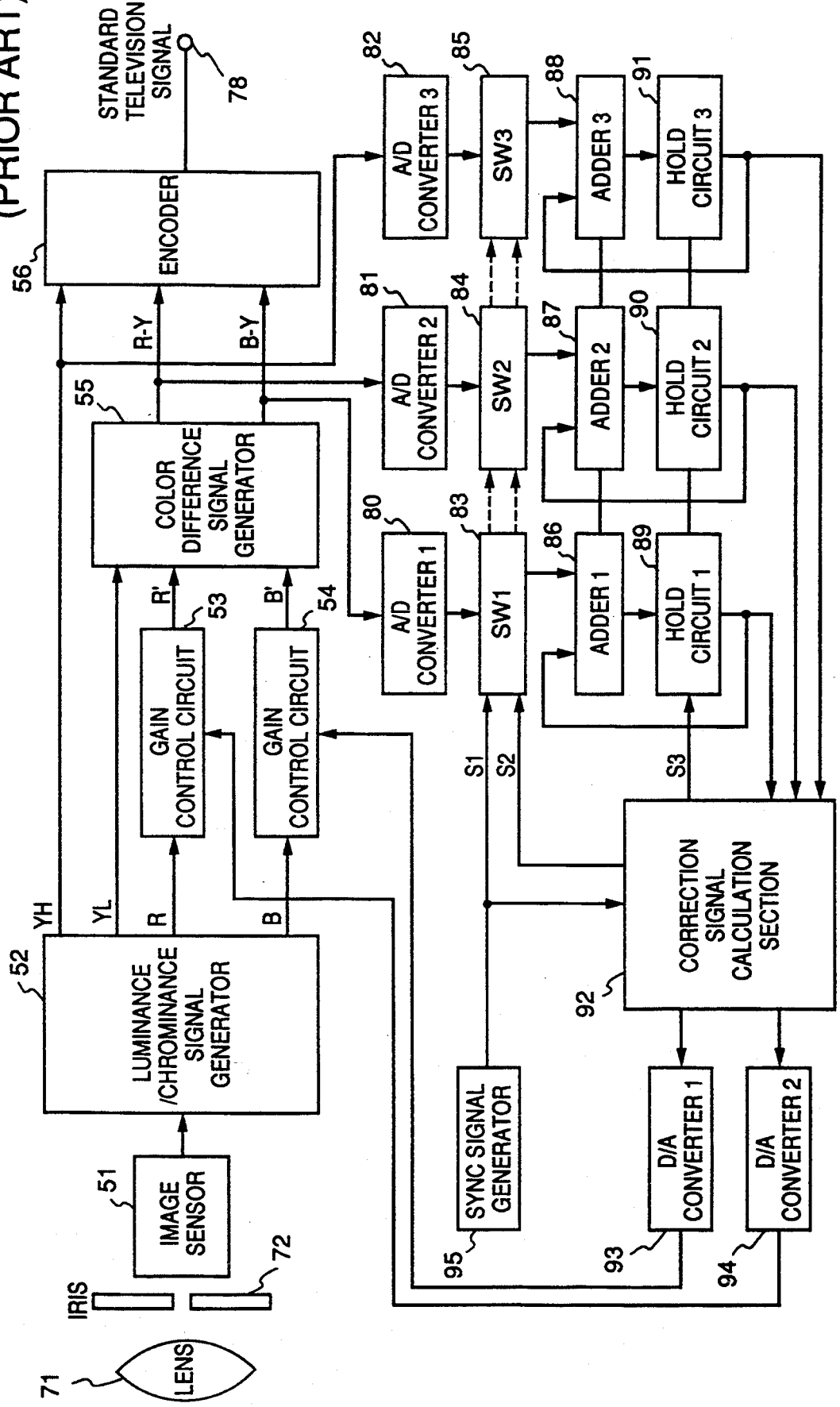
FIG. 4 is a block diagram showing the arrangement of a main part of a conventional image pickup apparatus designed to perform white balance correction by the white extraction scheme.
Figure 5:
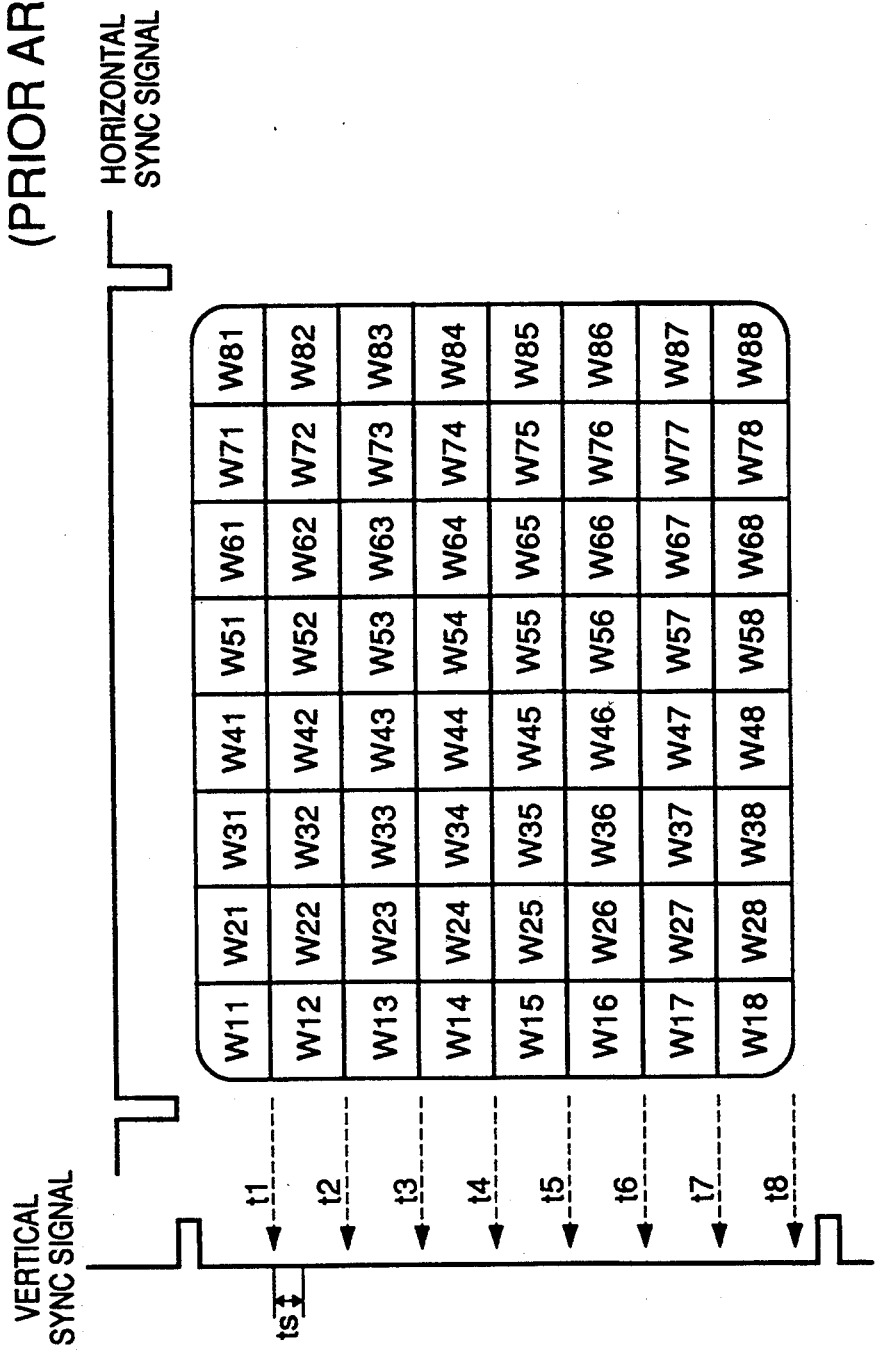
FIG. 5 is a view for explaining divided regions in the apparatus shown in FIG. 4 and the timings at which data are loaded from the divided regions.

The major difference between the image pickup apparatus shown in FIG. 28 and the apparatus shown in FIG. 4 is that a state change detection section 100 for detecting a change in state to quickly perform white balance correction is arranged, and divided regions used by a correction signal calculation section 92 are changed in accordance with information from the state change detection section 100.

An iris position detector 101 for detecting a change in brightness of a photographic frame and an external input circuit 102 for detecting a power switch operation and a change in camera mode are connected to the state change detection section 100. The correction signal calculation section 92 has a function of detecting a change in color temperature of ambient light.

Figure 29:
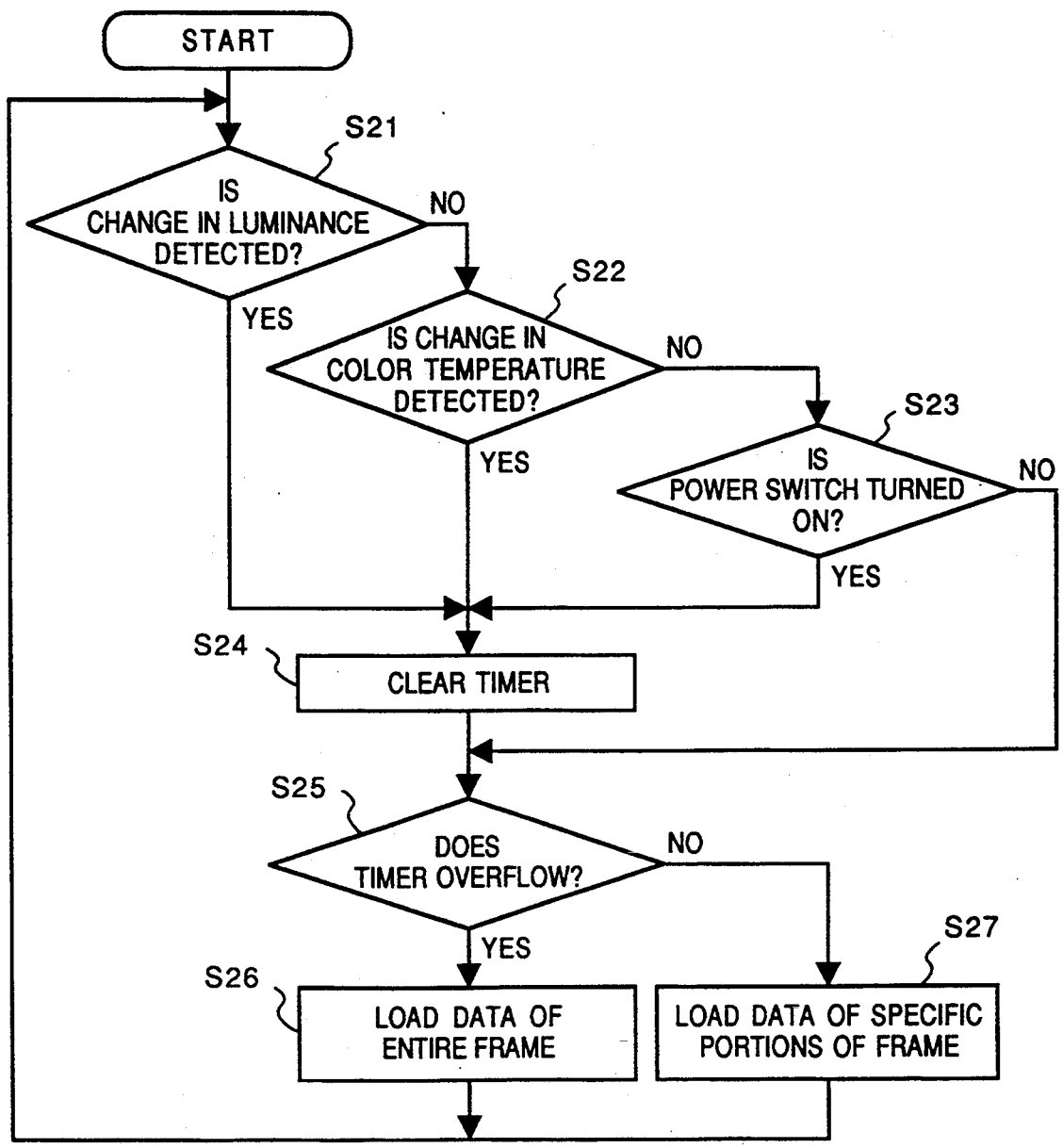
FIG. 29 is a flow chart for explaining an operation to be performed upon detection of a state change in the image pickup apparatus in FIG. 28.

FIG. 29 is a flow chart for explaining an operation to be performed when a change in state is detected by the state change detection section 100 in the image pickup apparatus in FIG. 28. Referring to FIG. 29, in steps S21, S22, and S23, a large change in brightness of a photographic frame, a change in color temperature, and a power switch operation are determined.

If a change in state is detected in any one of steps S21, S22, and S23, a timer (not shown) incorporated in the correction signal calculation section 92 is reset in step S24. In step S25, an overflow is monitored by checking whether the counted time of the timer exceeds a predetermined value. The flow advances to step S27 to load integral data from specific regions of a plurality of divided regions obtained by dividing a photographic frame in the correction signal calculation section 92, i.e., specific portions of the frame, until the counted time of the timer exceeds the predetermined value.

FIG. 30 shows regions, of the 64 divided regions, from which the integral data are loaded in step S27. That is, in step S27, the integral values of signals of only the regions indicated by the hatching in FIG. 30 are loaded by the correction signal calculation section 92, thus calculating a white balance correction value.

As a method of calculating a white balance correction value, one of the following two methods may be used. In the first method, the averages of the integral values of all the color difference signals (R−Y) and (B−Y) of the regions, from which the data are loaded, are calculated, and correction values which cause the averages to coincide with reference values Rref and Bref are calculated. In the second method, the integral value of each region is weighted depending on correspondence with a white object, and correction values which cause the resultant values to coincide with the reference values Rref and Bref are calculated.

FIG. 31 shows a sequence of loading the integral values of the respective signals (R−Y), (B−Y), and YH of the specific regions in FIG. 30, i.e., the hatched regions. In this case, the integral data of the respective signals of regions W11, W13, W15, and W17 are loaded in the first field, and the integral data of the respective signals of regions W22, W24, W26, and W28 are loaded in the second field. In this manner, the loading of integral data is performed.

As is apparent from FIG. 31, the time required to load integral data corresponding to one frame is an eight-field period. The time required for loading is half the time required to load the integral data of all the 64 regions. Therefore, the white balance correction speed in this case is twice the speed at which the integral data of all the 64 regions are loaded.

FIG. 32 shows other examples of regions, of the 64 divided regions, from which integral data are loaded in step S27. The regions indicated by the hatching in FIG. 32 are the regions from which integral data are loaded.

In this case, similar to the above-described case, as a method of calculating a white balance correction value, one of the following two methods may be used. In the first method, the averages of the integral values of the respective color difference signals (R−Y) and (B−Y) of the regions, from which the data are loaded, are calculated, and correction values which cause the averages to coincide with reference values Rref and Bref are calculated. In the second method, the integral value of each region is weighted depending on correspondence with a white object, and correction values which cause the resultant values to coincide with the reference values Rref and Bref are calculated.

FIG. 33 shows a sequence of loading the integral values of the respective signals (R−Y), (B−Y), and $Y_H$ of the specific regions in FIG. 32, i.e., the hatched regions. In this case, the integral data of the respective signals of regions W11, W33, W55, and W77 are loaded in the first field, and the integral data of the respective signals of regions W81, W63, W45, and W27 are loaded in the second field. In this manner, the loading of integral data is performed.

As is apparent from FIG. 33, the time required to load integral data corresponding to one frame is a four-field period. The time required for loading is ⅛ the time required to load the integral data of all the 64 regions. Therefore, the white balance correction speed in this case is four times the speed at which the integral data of all the 64 regions are loaded.

As described above, according to the image pickup apparatus of the embodiment, in a normal operation, the integral values of the respective signals (R−Y), (B−Y), and $Y_H$ of all the divided regions are loaded to perform white balance correction with high precision. Only when an abrupt change in photographic state has occurred, the integral values of the respective signals (R−Y), (B−Y), and $Y_H$ of only specific regions are loaded for a specific period of time to calculate white balance correction values. With this operation, when an abrupt change in photographic state has occurred, the white balance correction speed can be sufficiently increased.

In the apparatus of the embodiment described above, the integral data of the color signals of all the divided regions are loaded in a normal white balance correction state. However, even in a normal white balance correction state, if data are uniformly distributed on the entire frame, the integral data of only specific regions may be extracted. In this Case, when an abrupt change in photographic state has occurred, integral data may be loaded from a smaller number of specific regions.

As described above, according to the image pickup apparatus of the third embodiment, the white balance correction mode of allowing the use of only color data of specific regions of a plurality of regions is set so that white balance correction can be performed at a high speed when an abrupt change in state has occurred. Even if, therefore, an abrupt change in photographic state occurs, the apparatus is prevented from photographing an image lacking in white balance for a long period of time. In addition, since color data are obtained from many regions in a normal operation, white balance correction can be performed with high precision.

The present invention is not limited to the above embodiments and various changes and modifications can be made within the spirit and scope of the present invention. Therefore, to apprise the public of the scope of the present invention the following claims are made.

What is claimed is:

1. An image pickup apparatus, comprising:
   image pickup means;
   calculation means for calculating a plurality of color temperature data by using a color signal in a color video signal output from an output terminal of said image pickup means, said calculation means including detection means for extracting a color signal from each of a plurality of regions of a photographic frame of said image pickup means and detecting color data corresponding to the color signal extracted from each region, and the plurality of color temperature data including first color temperature data calculated by using at least color data of all the plurality of regions, and second color temperature data calculated by using only color data of some of the plurality of regions;
   selection means for selecting one of the plurality of color temperature data; and
   white balance correction means for correcting white balance of the color video signal by using the color temperature data selected by said selection means.

2. An apparatus according to claim 1, wherein said selection means selects color temperature data, of the plurality of color temperature data, which minimizes a white balance correction amount.

3. An apparatus according to claim 1, wherein the plurality of regions are a plurality of regions obtained by dividing the entire frame, and the first color temperature data is calculated from an average value of the color data of all the regions.

4. An apparatus according to claim 1, wherein the second color temperature data is calculated from an average value of the color data of only regions, of the plurality of regions, which fall within a range in which a color signal corresponding to an object whose color signal represents white changes.

5. An apparatus according to claim 1, wherein the second color temperature data is calculated from only the color data of a region, of the plurality of regions, which corresponds to a highest brightness level.

6. An image pickup apparatus, comprising:
   image pickup means;
   white balance correction means for correcting white balance of a color video signal output from an output terminal of said image pickup means, said white balance correction means comprising detection means for extracting a color signal from each of a plurality of regions of a photographic frame of said image pickup means and detecting color data associated with the color signal extracted from each region; and
   switching means for switching a mode of said white balance correction means between a plurality of modes having different correction speeds, the plurality of modes including a first correction mode having a high correction speed, a second correction mode having a low correction speed, and a third correction mode for stopping correction, said switching means comprising determination means for determining a change in color temperature on the basis of the color data associated with said respective regions, said switching means switching said white balance correction means from the third correction mode to the first or second correction mode when a change in color temperature is determined by said determination means.

7. An image pickup apparatus, comprising:
   image pickup means;
   white balance correction means for correcting white balance of a color video signal output from an output terminal of said image pickup means, said white balance correction means comprising detection means for extracting a color signal from each of a plurality of regions of a photographic frame of said image pickup means and detecting color data associated with the color signal extracted from each region; and
   switching means for switching a mode of said white balance correction means between a plurality of modes having different correction speeds, the plurality of modes including a first correction mode having a high correction speed, a second correction mode having a low correction speed, and a third correction mode for stopping correction, said switching means comprising determination means for determining a change in color temperature on the basis of the color data associated with said respective regions, said switching means switching said white balance correction means from the second or third correction mode to the first correction mode when a change in color temperature is determined by said determination means and a luminance level of the color video signal greatly changes.

8. An apparatus according to any one of claims 6 and 7, wherein said switching means switches said white balance correction means from the first correction mode to the second correction mode when the first correction mode continues for a predetermined period of time.

9. An apparatus according to any one of claims 6 and 7, wherein said switching means switches said white balance correction means from the first or second correction mode to the third correction mode when a luminance level of the color video signal decreases.

10. An apparatus according to any one of claims 6 and 7, wherein said switching means switches said white balance correction means from the first or second correction mode to the third correction mode when an amount of white balance correction performed by said white balance correction means becomes almost zero.

11. An apparatus according to any one of claims 6 and 7, wherein said switching means switches said white balance correction means from the third correction mode to the first or second correction mode when a luminance level of the color video signal greatly changes.

12. An image pickup apparatus comprising:
   image pickup means;
   detection means for detecting color data from a color video signal corresponding to each of a plurality of regions of a photographic frame of said image pickup means;

white balance correction means for correcting white balance of a color video signal output from an output terminal of said image pickup means by using color data output from said detection means; and switching means for switching a mode of said white balance correction means between a first mode in which color data of all the regions can be used, and a second mode in which color data of only some of the plurality of regions can be used.

13. An apparatus according to claim 12, wherein said some regions from which color data which can be used in the second mode are detected are predetermined regions of the plurality of regions.

14. An apparatus according to claim 12, wherein a correction speed of the second mode is higher than that of the first correction mode.

15. An apparatus according to claim 12, wherein said switching means switches said white balance correction means from the first mode to the second mode when a luminance level of the color video signal changes.

16. An apparatus according to claim 12, wherein said switching means comprises determination means for determining a change in color temperature by using color data of the plurality of regions and switches said white balance correction means from the first mode to the second mode when a change in color temperature is determined by said determination means.

17. An apparatus according to claim 12, wherein said switching means switches said white balance correction means from the second mode to the first mode when the second mode continues for a predetermined period of time.

18. An image pickup apparatus, comprising:
image pickup means;
detection means for detecting color data from a color video signal corresponding to each of a plurality of regions of a photographic frame of said image pickup means;
white balance control means for controlling a white balance of said color video signal based on an output of said detection means; and
selecting means for selecting one of a first mode in which color data of a first number of regions is used, and a second mode in which color data of a second number of regions is used, wherein said first number and said second number are different from each other.

19. Apparatus according to claim 18, wherein said first number is larger than said second number.

20. Apparatus according to claim 19, wherein said first number of regions includes all regions of the photographic frame.

21. Apparatus according to claim 18, wherein said selecting means selects one of the first mode and the second mode according to a luminance level of said color video signal.

22. An image pickup apparatus, comprising:
image pickup means;
detection means for detecting color data from a color video signal corresponding to each of a plurality of regions of a photographic frame of said image pickup means;
white balance control means for controlling a white balance of said color video signal based on an output of said detection means; and
selecting means for selecting one of a first mode in which color data of a first number of regions is used, and a second mode in which color data of a second number of regions, different from said first number of regions, is used.

23. Apparatus according to claim 22, wherein said first number is larger than said second number.

24. Apparatus according to claim 23, wherein said first number of regions includes all regions of the photographic frame.

25. Apparatus according to claim 22, wherein said selecting means selects one of the first mode and the second mode according to a luminance level of the color video signal.

* * * * *

UNITED STATES PATENT AND TRADEMARK OFFICE
CERTIFICATE OF CORRECTION

PATENT NO. : 5,420,630
DATED : May 30, 1995
INVENTOR(S) : HIROFUMI TAKEI

It is certified that error appears in the above-indentified patent and that said Letters Patent is hereby corrected as shown below:

COLUMN 1,

Line 58, "e" should read --x--.

COLUMN 2,

Line 44, "E" should read --x--;
    Line 59, "E" should read --x--; and
    Line 63, "E" should read --x--.

COLUMN 6,

Line 33, "is" should read --is a--; and
    Line 38, "is" should read --is a--.

COLUMN 10,

Line 50, "are divided is" should read --is divided are--.

COLUMN 14,

Line 34, "decrease." should read --to decrease.--; and
    Line 45, "increase." should read --to increase.--.

UNITED STATES PATENT AND TRADEMARK OFFICE
CERTIFICATE OF CORRECTION

PATENT NO. : 5,420,630

DATED : May 30, 1995

INVENTOR(S) : HIROFUMI TAKEI

It is certified that error appears in the above-indentified patent and that said Letters Patent is hereby corrected as shown below:

<u>COLUMN 15,</u>

Line 24, "devide" should read --divide--.

<u>COLUMN 22,</u>

Line 62, "Case," should read --case,--.

Signed and Sealed this

Third Day of October, 1995

BRUCE LEHMAN

*Attest:*

*Attesting Officer*          Commissioner of Patents and Trademarks